(12) United States Patent
O'Connor et al.

(10) Patent No.: US 8,147,893 B2
(45) Date of Patent: Apr. 3, 2012

(54) REFRIGERATOR STABLE PRESSURIZED BAKING BATTER

(75) Inventors: Sean Francis O'Connor, San Francisco, CA (US); Nathan Steck, Menlo Park, CA (US)

(73) Assignee: Blaster Food Technologies, LP, Scottsdale, AZ (US)

( * ) Notice: Subject to any disclaimer, the term of this patent is extended or adjusted under 35 U.S.C. 154(b) by 294 days.

(21) Appl. No.: 11/760,647

(22) Filed: Jun. 8, 2007

(65) Prior Publication Data

US 2007/0286933 A1  Dec. 13, 2007

Related U.S. Application Data

(60) Provisional application No. 60/812,674, filed on Jun. 9, 2006.

(51) Int. Cl.
*A21D 10/04* (2006.01)
(52) U.S. Cl. ........................................ 426/549; 426/116
(58) Field of Classification Search .................. 426/116, 426/549
See application file for complete search history.

(56) References Cited

U.S. PATENT DOCUMENTS

| | | | |
|---|---|---|---|
| 2,849,323 A | | 8/1958 | Young |
| 3,011,896 A | | 12/1961 | Eber et al. |
| 3,272,387 A | | 9/1966 | Katz et al. |
| 3,472,423 A | | 10/1969 | Kaplan |
| 3,490,923 A | | 1/1970 | Eisman, Jr. et al. |
| 3,513,886 A | | 5/1970 | Easter et al. |
| 3,620,763 A | | 11/1971 | Hans |
| 3,710,538 A | | 1/1973 | Lowy et al. |
| 3,753,734 A | | 8/1973 | Kaplow et al. |
| 3,784,710 A | | 1/1974 | Earle |
| 3,795,183 A | | 3/1974 | Roth et al. |
| 3,970,763 A | | 7/1976 | Moran et al. |
| 4,353,932 A | * | 10/1982 | Bone .............................. 426/532 |
| 4,504,510 A | | 3/1985 | Aliberto et al. |
| 5,147,665 A | * | 9/1992 | Furcsik ............................ 426/19 |
| 5,858,440 A | | 1/1999 | Laughlin et al. |
| 5,989,612 A | * | 11/1999 | King et al. ..................... 426/335 |
| 6,217,929 B1 | * | 4/2001 | Hahn ............................. 426/549 |
| 6,244,528 B1 | | 6/2001 | Wallis et al. |
| 6,787,175 B2 | | 9/2004 | Pedrick et al. |
| 6,863,917 B2 | | 3/2005 | Redding, Jr. et al. |
| 2003/0072862 A1 | * | 4/2003 | Pruden et al. ................. 426/549 |
| 2003/0203058 A1 | * | 10/2003 | Cheruvanky et al. ......... 424/750 |
| 2004/0033291 A1 | | 2/2004 | Burgermeister |
| 2004/0033300 A1 | | 2/2004 | Takahashi et al. |
| 2004/0043123 A1 | * | 3/2004 | Triantafyllou Oste et al. ............................. 426/549 |
| 2004/0047950 A1 | * | 3/2004 | Gambino et al. ............... 426/94 |
| 2005/0249843 A1 | | 11/2005 | Wallis |

FOREIGN PATENT DOCUMENTS

FR  2672469  8/1992

OTHER PUBLICATIONS

Machine Translation and Derwent English Abstract of French Publication No. 2672469, Ruga, Eduouard, published Aug. 14, 1992.*
"Organic Foods Continue to Grow in Popularity in U.S." Whole Foods Market, Inc., posted Oct. 22, 2004. Retrieved from website Dec. 7, 2009 on wholefoodsmarket.com. pp. 1-3.*
Food Processing Technology, Principles and Practice, Part IV—Removal of Heat, Chapter 19—Chilling. Ed. P. Fellows. CRC Press, 2000. Woodhead Publishing Ltd. Second Edition. pp. 387-405.*
James Jay. Modern Food Microbiology 5th Edition. 1996, Chapman & Hall. pp. 55-56.*
Tressler et al., "Food Products Formulary," vol. 2, AVI Pub., pp. 136-140 (1975).
"Food Processing," 1971, 32 (11) 53 (Dialog 0047495, item 1, file 51).
"Spray Technology and Marketing," p. 6, Jul. 1993 (Dialog 02917342, item 10, file 16).
"Innovator's Digest," vol. 90(12), Jun. 5, 1990 (Dialog 01196880, item 13, file 16).
"Cosmetics and Toiletries," vol. 110(6), Jun. 1995 (Dialog 09828300, item 1, file 148).
"Paper, Film and Foil Converter," vol. 67(11), p. 82, Nov. 1993 (Dialog 06759017, item 2, file 148).
"Packaging Week," vol. 5(38), p. 12, Feb. 14, 1990 (Dialog 04536713 item 13, file 148).
Reddi-Wip, Product Lineup, http://www.reddi-wip.com/products/products.html (last accessed Jun. 8, 2007).

* cited by examiner

Primary Examiner — D. Lawrence Tarazano
Assistant Examiner — Jenna A Watts
(74) Attorney, Agent, or Firm — Fliesler Meyer LLP

(57) ABSTRACT

In various embodiments of the present invention, a bakable batter mixed using cold process conditions and provided in a pressurized can, can be used to bake a variety of food products. In various embodiments of the present invention, a bakable batter mixed under inert atmosphere conditions and provided in a pressurized can, can be used to bake waffles and pancakes. Carbon dioxide is combined with a water-mixed dry batter recipe under pressure at reduced temperature to give a refrigerator stable batter mix. The carbon dioxide reduces the viscosity of the batter to allow the batter to be dispensed for the life time of the product. The carbon dioxide aerates the food product giving light and fluffy baked products. The carbon dioxide acts as a browning agent while the food product is baking to give a brownish appearance, crunchy texture and attractive taste to the food product.

3 Claims, 6 Drawing Sheets
(1 of 6 Drawing Sheet(s) Filed in Color)

REFRIGERATOR STABLE PRESSURIZED BAKING BATTER

PRIORITY CLAIM

The present application claims the benefit of priority under 35 U.S.C. §119(e) to U.S. Provisional Patent Application No. 60/812,674, entitled "REFRIGERATOR STABLE PRESSURIZED BAKING BATTER", inventors: Sean Francis O'Connor and Nathan Steck, filed Jun. 9, 2006, which application is incorporated herein by reference.

FIELD OF THE INVENTION

The present invention is directed to food products, specifically pre-mixed or ready to cook batters and dough.

BACKGROUND OF THE INVENTION

A number of different types of food products come in pressurized dispensers, including decorative icings, dessert toppings, whipping cream, whipped cream substitute and Cheez Whiz®, a thick sauce product made by Kraft Foods®.

Consumers have come to find foods provided in pressurized cans to be convenient to use. Hence, different foods provided in such a manner are advantageous. Typically, dough and batter used in baking comes in dry form or must be assembled from component ingredients from scratch.

SUMMARY OF THE INVENTION

Although a number of inventors have proposed bakable batters in a pressurized can, there is no commercially successful product currently on the market. This reflects the problem in developing a batter that has an acceptable shelf storage life in a pressurized can, the ability to freeze store the product without deleterious separation of components, obtaining an attractively browned appearance, a palatable taste and light and fluffy texture when baked.

In various embodiments of the present invention, a cold process of preparing a food product to be provided in a pressurized can without the need for pasteurization of the ingredients results in a refrigeration stable product. In various embodiments of the present invention, a cold process of preparing a food product to be provided in a pressurized can without the need for pasteurization of all of the ingredients results in a refrigeration stable product. In various embodiments of the present invention, the ingredients include a browning agent which is used to control the appearance and texture of the product. In various embodiments of the present invention, the ingredients enable freezing and thawing of the product without phase separations. In various embodiments of the present invention, a browning agent is used which is compatible with the cold process and pressurized can application of the product. In various embodiments of the present invention, the ingredients used to allow freezing and thawing are compatible with one or more of the browning agent, the cold process preservation and pressurized can application of the product. In various embodiments of the present invention, the ingredients stored in the can include one or more preservative. In various embodiments of the present invention, different baking products including waffles, pancakes, muffins, cup cakes, ginger bread, cookies and brownies are formulated using the cold process into a ready to use pressurized can and dispensed directly into the cooking apparatus. In various embodiments of the present invention, the batter in the can be combined with gasses and a water-mixed dry batter recipe under pressure.

BRIEF DESCRIPTION OF THE FIGURES

This application contains at least one drawing or photograph executed in color. Copies of this patent application publication with color drawing(s) will be provided by the Office upon request and payment of the necessary fee.

This invention is described with respect to specific embodiments thereof. Additional aspects can be appreciated from the Figures in which.

DETAILED DESCRIPTION OF THE INVENTION

Figure 1:
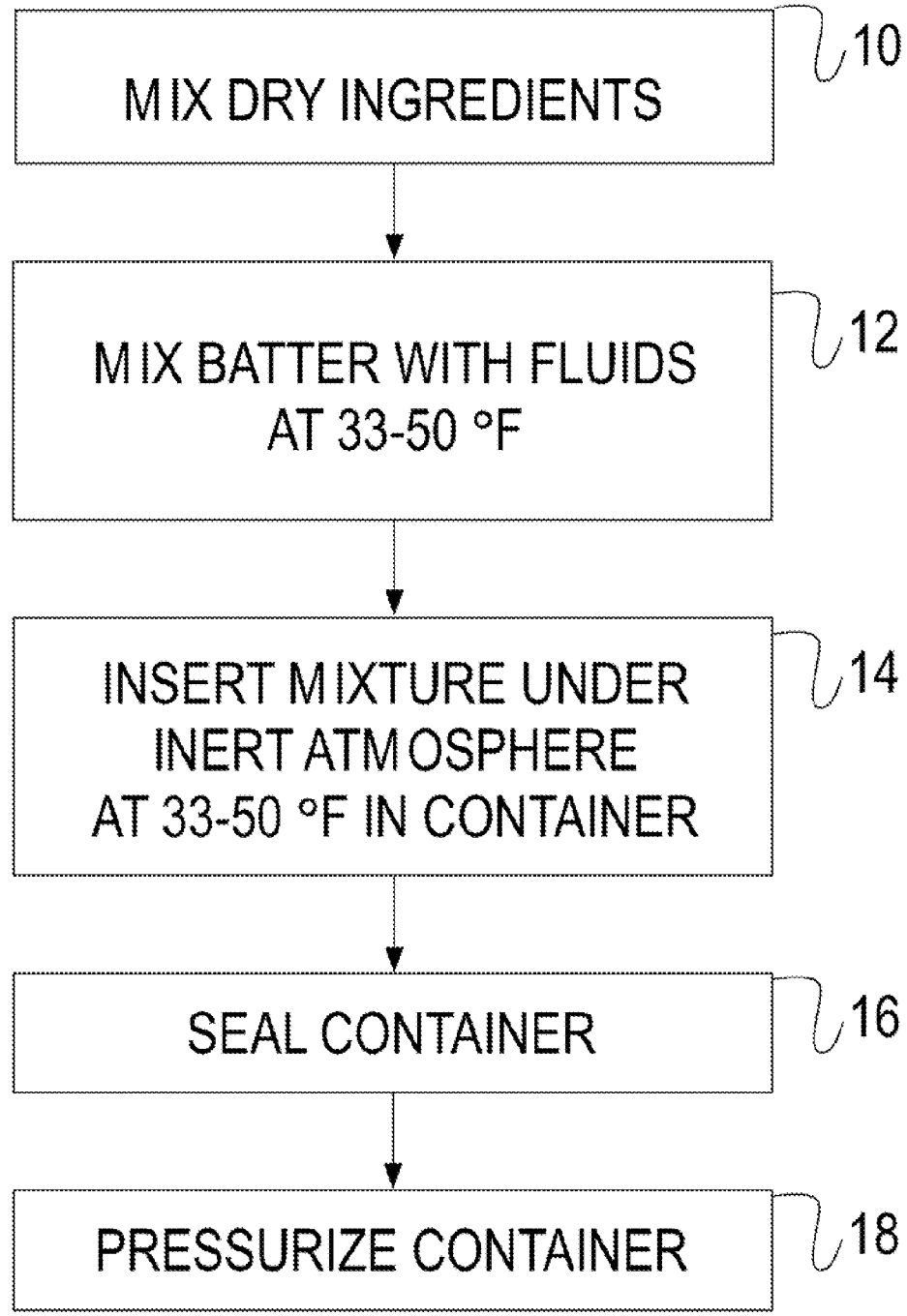
FIG. 1 shows a flow chart outlining the steps involved in preparing the batter for dispensing.

In an embodiment of the present invention, a batter mix such as that which can be useful for making pancakes, waffles, muffins, cup cakes, ginger bread, cookies and brownies can be mixed with water and transferred to a can. In an embodiment of the present invention, an antibacterial agent can be added to the batter and transferred to a can. In an embodiment of the present invention, a can or container can be sealed and pressurized with a mixture of water soluble and non water-soluble gasses. In an embodiment of the present invention, the pressurized gasses are a mixture of $N_2$ and $CO_2$. In an alternative embodiment of the invention, the pressurized gas is 100% $CO_2$. In an embodiment of the present invention, the antibacterial agent can be cultured dextrose. In an alternative embodiment of the invention, the antibacterial agent is sodium lactate. In various embodiments of the present invention, the ingredients include a browning agent which is used to control the appearance and texture of the product. In various embodiments of the present invention, the ingredients enable freezing and thawing of the product without phase separations. In various embodiments of the present invention, a browning agent is used which is compatible with the cold process and pressurized can application of the product. In various embodiments of the present invention, the ingredients used to allow freezing and thawing are compatible with one or more of the browning agent, the cold process preservation process and the pressurized can application of the product. A dispenser suitable for use in storing and dispensing the batter provided therein is well known in the industry and to consumers alike, and includes a spout, which releases pressurized contents when an individual depresses the spout to expend the contents of the can. There are numerous variations on the shape and type of dispenser, suitable for use with the present invention. The inventors have empirically determined that providing a refrigeration-stable, bakable batter in a pressurized can, using the specified gas and pressure combinations set forth herein, produces a superior quality baked good when the product is cooked in a manner similar to current dry mix products stored in boxes or bags.

The mix recipe can be used to create pancakes (single sided grilling) or waffles (double sided, patterned grilling). The resultant product yields fluffy pancakes and light crisp waffles. In an embodiment of the present invention, the fluffy nature of the pancakes can be a result of the partial pressures of the gasses used to pressurize the can. In an embodiment of the present invention, the fluffy nature of the pancakes can be a result of the partial pressure of the water soluble gasses used to pressurize the can. In an embodiment of the present invention, the fluffy nature of the pancakes can be a result of the incorporation of the water-soluble gas into the batter mix. In an embodiment of the present invention, the fluffy nature of the pancakes can be a result of the ratio of the water to batter mix.

In an embodiment of the present invention, FIG. 1 shows a flow chart for assembling a charged batter-filled food in a pressurized container. Generally, the batter recipe will be blended at step 10, mixed with water and preservatives at step 12, inserted into a pressurized sealable container at step 14, the container sealed at step 16, and the container pressurized in accordance with well-known techniques at step 18. In an embodiment of the present invention, steps 10-14 are carried out in an inert atmosphere. In an embodiment of the present invention, steps 10-14 are carried out at between 32-48° F. In an alternative embodiment of the present invention, steps 12-14 are carried out at between 38-44° F.

In an embodiment of the present invention, the ingredients of the mix include wheat flour, sugar, nonfat dry milk, whole dried egg, salt, sodium bicarbonate, dicalcium phosphate dihydrate, xanthan gum, cultured dextrose and water. This recipe is mixed by blending all the dry ingredients, adding water at approximately 1° C. (34° F.) to the cultured dextrose and then this solution to the dry blend in an appropriate amount (set forth below) depending on the desired batter product while keeping the temperature of the batter below approximately 4° C. (40° F.). The batter can be stored in an inert atmosphere while being transferred to piston fillers used to dispense the batter into the aerosol line for filling the pressurized cans.

In an alternative embodiment of the invention, the ingredients are certified organic. The organic ingredients of the mix include wheat flour, sugar, whole dried egg, powdered soy, salt, sodium bicarbonate, dicalcium phosphate dehydrate, sodium lactate and water. This recipe is mixed by blending all the dry ingredients, adding water at approximately 1° C. (34° F.) to the sodium lactate and then this solution to the dry blend in an appropriate amount (set forth below) depending on the desired batter product while keeping the temperature of the batter below approximately 4° C. (41° F.). The batter can be stored in an inert atmosphere while being transferred to piston fillers used to dispense the batter into the aerosol line for filling the pressurized cans.

In an embodiment of the present invention, the pressurized gas (100% $CO_2$) is used as a preservative of the ingredients stored in the can. In an embodiment of the present invention, sodium lactate can be used as a preservative of the ingredients stored in the can. In an embodiment of the present invention, the pressurized gas (100% $CO_2$) and sodium lactate can be used as preservatives of the ingredients stored in the can. In an alternative embodiment of the present invention, sorbic acid can be used as a preservative of the ingredients stored in the can. In an embodiment of the present invention, potassium sorbate can be used as a preservative of the ingredients stored in the can. In an embodiment of the present invention, propionic acid can be used as a preservative of the ingredients stored in the can.

In an embodiment of the present invention, the mix utilized for the present invention can be a specially blended mix. In an embodiment of the present invention, the mix utilized for the present invention can be an organic batter blended mix. In an embodiment of the present invention, the product produced with an organic batter blended mix can be an organic product. In an embodiment of the present invention, other dry mix can be utilized for the present invention. In an embodiment of the present invention, other dry-mix products can be utilized with the present invention. In an embodiment of the present invention, the dry mix can be activated by a combination of water, milk or other fluids.

Table 1.0 outlines the breakdown of the total calories in a 100 g (3.53 oz.) serving of the mixed pancake batter.

TABLE 1.0

| Nutritional Analysis per 100 g | |
|---|---|
| Calories | 130 cal |
| Fat Calories | 10 cal |
| Sat Fat Calories | 0 cal |
| Total Fat | 1 g |
| Saturated Fat | 0 g |
| Stearic Acid | 0 g |
| Trans Fatty Acids | 0 g |
| Polyunsaturated Fat | 0 g |
| Omega 6 | 0 g |
| Omega 3 | 0 g |
| Monounsaturated Fat | 0 g |
| Cholesterol | 15 mg |
| Sodium | 160 mg |
| Potassium | 0 g |
| Total Carbohydrate | 28 g |
| Dietary Fiber | 4 g |
| Soluble Fiber | 0 g |
| Insoluble Fiber | 0 g |
| Sugars | 4 g |
| Sugar Alcohol | 0 g |
| Other Carbohydrate | 20 g |
| Protein | 4 g |
| Vitamin A | 0% DV |
| Vitamin A (RE) | RE |
| Vitamin C | 0% DV |
| Calcium | 2% DV |
| Iron | 10% DV |
| Vitamin D | 0% DV |
| Vitamin E | 0% DV |
| Vitamin K | 0% DV |
| Thiamin | 0% DV |
| Riboflavin | 0% DV |

TABLE 1.0-continued

Nutritional Analysis per 100 g

| | |
|---|---|
| Niacin | 0% DV |
| Vitamin B6 | 0% DV |
| Folate | 0% DV |
| Vitamin B12 | 0% DV |
| Biotin | 0% DV |
| Pantothenic Acid | 0% DV |
| Phosphorous | 0% DV |
| Iodine | 0% DV |
| Magnesium | 0% DV |
| Selenium | 0% DV |
| Copper | 0% DV |
| Manganese | 0% DV |
| Chromium | 0% DV |
| Molybdenum | 0% DV |
| Chloride | 0% DV |

Processing Procedure

In an embodiment of the present invention, a dry mixing vessel can be used to blend all the ingredients. In an embodiment of the present invention, water at approximately 1° C. (34° F.) can be added to the dry mix. In an embodiment of the present invention, the batter can be blended for approximately 5 to 7 minutes on a high sheer mixer. In an embodiment of the present invention, the batter can be blended until smooth without lumps on a high sheer mixer. In an embodiment of the present invention, the batter can be blended at less than 4° C. (40° F.) on a high sheer mixer. In an embodiment of the present invention, the batter can be stored in an inert atmosphere directly after mixing until being loaded in pressurized cans. In an embodiment of the present invention, the batter can be stored under nitrogen to prevent the sodium bicarbonate reaction for early leavening. In an embodiment of the invention, the batter is not stored under nitrogen because the sodium bicarbonate is encapsulated. Encapsulated sodium bicarbonate does not release until it reaches 58-61° C. (136-142° F.) directly after mixing and before being loaded in the pressurized cans. In an embodiment of the present invention, the batter can be pumped to piston fillers on an aerosol line prior to being loaded in the pressurized cans.

Cold Process Procedure

In an embodiment of the present invention, the blending of the ingredients can be carried out in a refrigerated production room. In an embodiment of the present invention, the blending of the water and the dry ingredients can be carried out in a chilled production room. In an embodiment of the present invention, the blending of the water and the dry ingredients can be carried out with refrigerated production equipment. In an embodiment of the present invention, the blending of the water and the dry ingredients can be carried out with refrigerated production equipment in a refrigerated production room. In an embodiment of the present invention, the batter temperature can be controlled to not exceed approximately 10° C. (50° F.). In an alternative embodiment of the present invention, the batter temperature can be controlled to not exceed approximately 4° C. (40° F.). In an embodiment of the present invention, in a jacketed mixing tank the water coolant can be introduced at approximately 1±2° C. (34±2° F.). In an embodiment of the present invention, full scrape mix agitator can be utilized in mixing the ingredients. In an embodiment of the present invention, high shear cage agitator can be utilized in mixing the ingredients. In an embodiment of the present invention, the dry blend of ingredients can be slowly pumped into the mixing vessel with slow agitation for approximately 10 minutes. In an embodiment of the present invention, batter can be mixed for approximately 5 to 7 minutes on high shear speed, where the batter temperature is not allowed to exceed approximately 4° C. (40° F.).

In an embodiment of the present invention, cultured dextrose (0.10-3.00%) can be added to the water to be mixed with the dry ingredients. In an embodiment of the present invention, sodium lactate (below approximately 1%) can be added to the water prior to agitation with the dry mix to minimize 'off-flavor'. In an embodiment of the present invention, cultured dextrose (greater than approximately 0.5%) can be added to the water prior to agitation with the dry mix to ensure 120 day refrigerated 'shelf life'. In an embodiment of the present invention, cultured dextrose (0.50-1.00%) can be added to the water prior to agitation with the dry mix. In an alternative embodiment of the present invention, sodium lactate and carbon dioxide can be added to the batter prepared with the cold process to ensure 120 day refrigerated 'shelf life'.

In various embodiment of the present invention, the water ranges from approximately 20% to approximately 80% of the dry batter weight (on a % by weight basis) for waffles, pancakes, muffins, cup cakes, and ginger bread, cookies and brownies formulations. In an embodiment of the present invention, a cookie mix can be made by mixing approximately 20% water with approximately 80% dry mix. In an embodiment of the present invention, a brownie mix can be made by mixing approximately 30% water with approximately 70% dry mix. In an embodiment of the present invention, a cup cake mix can be made by mixing approximately 30% water with approximately 70% dry mix. In an embodiment of the present invention, a pancake mix can be made by mixing approximately 50% water with approximately 50% dry mix. In an embodiment of the present invention, a waffle mix can be made by mixing approximately 60% water with approximately 40% dry mix. In an embodiment of the present invention, a moose mix can be made by mixing approximately 80% water with approximately 20% dry mix. In an alternative embodiment of the present invention, the water can be 43% by weight of the mix for waffles, pancakes, muffins, cup cakes, ginger bread, cookies and brownies.

In various embodiments of the invention, the ratio of water to dry mix varies depending on the nature of the dry mix. All-purpose flour has higher levels of gluten and as a result requires more water. In contrast, pastry flour has lower levels of gluten, which requires less water to generate the same consistency mix. In an embodiment of the present invention, the water is 60% by weight for waffles using an 'organic' batter mix. In an embodiment of the present invention, the water is 40% by weight for waffles using a non-organic dry mix containing all-purpose flour.

In an embodiment of the present invention, the water varies depending on the required consistency of the product. In an embodiment of the present invention, a pancake mix can be made by mixing approximately 50% water with approximately 50% dry mix. In an embodiment of the present invention, the pancake mix can vary between 40.5-52.5% by weight water depending on the required consistency. In an embodiment of the invention, one mix can be used for both waffles and pancakes.

In an embodiment of the present invention, the dry mix ingredients are greater than 95% organic. In an embodiment of the invention, there are no available substitute organic ingredients for the non-organic ingredients in the dry mix. In an embodiment of the invention, where the dry mix ingredients are greater than 95% organic and there are no available substitute organic ingredients for the non-organic ingredients, the food product can be certified as organic.

In an embodiment of the present invention, an amount of sorbic acid can be used to adjust the pH of the batter mix. In an embodiment of the present invention, an amount of potassium sorbate can be used to adjust the pH of the batter mix. In an embodiment of the present invention, the inclusion of one or more ingredients to control the pH in the batter provides a stable product, requiring refrigeration at approximately 4±2° C. (40±2° F.). In an embodiment of the present invention, the water to be added to the dry mix can be provided with approximately 0.1% potassium sorbate and approximately 0.05% sorbic acid (by weight).

In an embodiment of the present invention, an amount of potassium sorbate controls the growth of yeast and mold to keep the product stable. In an embodiment of the present invention, sodium lactate controls the growth of yeast, mold, lactic acid bacteria and *L. monocytogenes* to keep the product stable. In an embodiment of the present invention, an amount of cultured dextrose controls the growth of yeast and mold to keep the product stable. In an embodiment of the present invention, the inclusion of one or more ingredients to control the growth of mold and bacteria in the batter provides a stable product, requiring refrigeration at approximately 4±2° C. (40±2° F.).

In an embodiment of the present invention, batter can be pumped to a jacketed holding vessel, where the batter temperature is not allowed to exceed 4±2° C. (40±2° F.). In an embodiment of the present invention, batter can be pumped to a series of filling heads. In an embodiment of the present invention, sanitized lined cans can be introduced to the series of filling heads and filled with the batter. In an embodiment of the present invention, cans can be valved with tilt valve 2×0.0022 or vertical action valve 2×0.033×0.090 valves and the cans can be crimped and gassed to approximately 150±3 psi. Cans can be tipped, capped, packed and stored in cold storage at 4±2° C. (40±2° F.).

In various embodiments of the present invention, different baking products including waffles, pancakes, muffins, cup cakes, ginger bread, cookies and brownies are formulated using the cold process into a ready to use pressurized can and dispensed directly into the cooking apparatus.

The pressurizing step provides with different mixtures of a pressurized gas, depending on the particular application for the batter in the can. If the batter is to be used as a waffle mix, the gas can be nitrogen ($N_2$) and carbon dioxide ($CO_2$) mixed in a ratio of approximately 10% $N_2$ and approximately 90% $CO_2$ by weight, pressurized at 150 pounds per square inch (psi). For a pancake mix, the gas can be $N_2$ and $CO_2$ mixed in a ratio of approximately 50% each gas by weight. For a cup cake mix, the gas can be $N_2$ and $CO_2$ mixed in a ratio of approximately 55% $N_2$ and approximately 45% $CO_2$ by weight. For a brownie mix, the gas can be $N_2$ and $CO_2$ mixed in a ratio of approximately 85% $N_2$ and approximately 15% $CO_2$ by weight.

In an alternative embodiment of the invention, if the batter is to be used as a waffle mix, the gas can be 100% carbon dioxide ($CO_2$), pressurized at 150 pounds per square inch (psi).

Different batter mixtures require various pressurizing reagents and compositions in order to provide the optimal consistency for baking of the food product. For example, the batter in a gas container can be pressurized with carbon dioxide ($CO_2$). $CO_2$ is a water miscible or soluble gas. After sealing the can, the pressure drops considerably (up to approximately 40%) after canning because the $CO_2$ dissolves into the mixed batter in the can. For a waffle mix where the gas is 90% $CO_2$ this can have a significant impact on the final pressure. For a pancake mix, the gas composition can include both nitrogen ($N_2$) and $CO_2$. In contrast, to $CO_2$, $N_2$ is largely a non water-soluble gas. When $N_2$ and $CO_2$ are mixed in a ratio range of approximately 90% nitrogen and approximately 10% carbon dioxide to approximately 80% nitrogen and approximately 20% carbon dioxide, the $N_2$ will not be significantly absorbed by the batter mix, and the resulting total pressure can remain higher. By having approximately 10% to approximately 20% of the gas as $CO_2$, this combination gives sufficient gas emulsification of the batter to generate a light and fluffy pancake or waffle, while maintaining sufficient gas pressure for the entire life of the can. Gas composition and ratios for muffins are similar to waffles. Gas compositions and ratios for ginger bread, cookies and brownies formulations are similar to pancakes.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

A bakable food product is any food product which requires heating prior to serving. Bakable includes processes such as frying, poaching, grilling, bar-b-q-ing, heating in a waffle iron, heating in a sandwich maker, heating in a boiler, heating in a conventional oven, heating in a gas convection oven, heating in a microwave oven and heating in a toaster.

Example 1

Aim: to determine an acceptable pancake powder mix to water ratio; and determine suitable propellant(s) to make an aerosol packaged pancake batter.

Mix: 50/50 Elite Spice Pancake Mix/DI Water (~50° C.; ~120° F.); Preservatives (0.05% potassium sorbate and 0.05% sorbic acid); Fill: 16 oz; can: 214×804, 3-piece, lined; Propellants Tested: (i) 5 g Carbon Dioxide ($CO_2$), (ii) 2.8 g Nitrogen ($N_2$).

TABLE 1.1

Cook Test Results on the Aerosol Packaged Batter

| | Amount Dispensed, g | Appearance of Pancakes |
|---|---|---|
| Samples gassed with 5.0 g $CO_2$ | 32 | thinner pancakes |
| Samples gassed with 2.8 g $N_2$ | 58 | thicker, "sponge-like" pancakes |

Although different amounts of batter were dispensed with the different propellants (see Tables 1.1 and 1.2), the samples made similar diameter pancakes. This is due to the $CO_2$ dissolved (in water) in the $CO_2$ sample that gave the batter more volume.

TABLE 1.2

Spray Rates of Aerosol Packaged Batter

| | Pressure after 17 days, psi | Spray Rate, g/s |
|---|---|---|
| Samples gassed with 5.0 g $CO_2$ | 45 psi | 10.8 |
| Samples gassed with 2.8 g $N_2$ | 95 psi | 12.0 |

Initial tests showed that the ratio of 50/50 Elite Spice powder mix-to-water ratio made a batter that produced good pancakes and waffles. The consistency was typical of a pancake batter.

These samples were used to cook pancakes and waffles (using waffle iron). The sample gassed with $CO_2$ was more suitable to make waffles. The waffles produced were light and crispy. Because $CO_2$ is more soluble in water than $N_2$, the batter dispensed from the $CO_2$-gassed sample had dissolved $CO_2$ in it. When cooked in the waffle iron, the $CO_2$ escaped making the waffle light, thin and crispy. When this sample was used to make pancakes, the dissolved $CO_2$ escaped the batter during the cooking process making the pancakes flat and thin. The sample gassed with $N_2$ made better pancakes than the one gassed with $CO_2$. The $N_2$ pressurized the can, but did not really get absorbed or mixed in the water/batter. The batter dispensed was therefore denser and made thicker, sponge-like pancakes similar in appearance and texture to normal pancakes. When this sample was used to cook waffles, the waffles produced were thicker and denser. The test candidate preferred the thin and crispy waffles over the denser ones. On the other hand, they preferred the denser pancakes over the thin and flat ones. Summary of trial: samples gassed with $CO_2$ made good waffles; samples gassed with $N_2$ made good pancakes.

Example 2

Aim: to fine-tune the powder mix-to-water ratio and the amount of compressed gas to be used as propellant.

The following samples were prepared: (i) 50 powder mix/50 water; in 214×804 can; filled at 16 oz; gassed with 3.9 g $N_2$ at 130 psi; (ii) 45 powder mix/55 water; in 205×604 can; filled at 4 oz; gassed with 2.7 g $N_2$ at 130 psi; and (iii) 40 powder mix/60 water; in 214×804 can; filled at 12 oz; gassed with 4.6 g $N_2$ at 130 psi. Additionally, the following samples were prepared for test candidate testing: (iv) 50 powder mix/50 water; gassed with $CO_2$; (v) 47.5 powder mix/52.5 water; gassed with $N_2$.

Results

As in Example 1, sample (iv) that was 50/50 and gassed with $CO_2$ made thin, light and crispy waffles. Sample (v), that was 47.5% powder mix and 52.5% water was found to be less dense than sample (iv) and was easier to mix. Sample (v) also flowed faster and easier from the can gassed with $N_2$ and still made pancakes with attractive appearance, taste and texture. The quality of the pancake was comparable to sample (i) where the 50/50 formula was gassed with $N_2$. Test candidate test result: sample (iv) 50/50 with $CO_2$—good for waffles; sample (v) 47.5/52.5 with $N_2$—good for pancakes.

TABLE 2.1

Cook Test Results on $N_2$-Pressured Pancake Batter with Varying Powder Mix-to-Water Ratio.

| Powder Mix-to-Water ratio | Can | Fill, oz | Propellant | Results |
|---|---|---|---|---|
| 50/50 | 214 × 804 | 16 | 3.9 g $N_2$ gassed at 130 psi | batter was dense; the pancakes were sponge-like as typical pancakes |
| 45/55 | 205 × 604 | 4 | 2.7 g $N_2$ gassed at 130 psi | batter was less dense; cooked pancakes looked like typical pancakes (sponge-like with bigger air pockets) |
| 40/60 | 214 × 804 | 12 | 4.6 g $N_2$ gassed at 130 psi | batter was thin and runny |

Example 3

Aim: to conduct preliminary tests on different preservatives.

Mix: Pancake Batter: 47.5/52.7 Elite Spice Pancake Mix/DI Water. Screw cap glass vials. Primary Preservatives used: (i) 0.05% sorbic acid and 0.10% potassium sorbate; (ii) 0.10% sorbic acid and 0.20% potassium sorbate. Additional preservatives: EDTA, sodium benzoate, methyl paraben, propyl paraben and lactic acid. All the samples were aseptically prepared. One set of vials were was capped with $N_2$ and one set was not. All the vials were stored in the dark at room temperature for 1 week.

Results

The evaluation of the samples was limited to visual and olfactory testing. Based on these results, no preservative was suitable for the required batter applications. The results were almost identical in all the samples regardless of the preservative system used. All samples showed signs of phase separation, pressure built up and a sour odor was detected after a week. The phase separation was expected in such suspension with high level of water insoluble solids. The batter mixture can require an emulsifier or a suspending agent. The pressure build-up can have been due to: generation of $CO_2$ from bicarbonate leavening agent and/or microbial growth and/or possible fermentation. The souring of odor could have been due to fermentation or other microbial growth. The microorganisms can have come from powder mix.

TABLE 3.1

Preservative Test Results on Pancake Batter in Glass Vials with 0.05% Sorbic Acid and 0.10% Potassium Sorbate After 1 Week

| Additional Preservatives | Air Headspace | $N_2$ Headspace |
|---|---|---|
| None | no phase separation pressure build-up sour milk odor | phase separation pressure build-up sour milk odor |
| 200 ppm EDTA | beginning of phase separation pressure build-up sour milk odor | phase separation pressure build-up sour milk odor |
| 500 ppm EDTA | no phase separation pressure build-up sour milk odor | phase separation pressure build-up sour milk odor |
| 0.10% Na Benzoate | beginning of phase separation pressure build-up sour milk odor | phase separation pressure build-up sour milk odor |

TABLE 3.1-continued

Preservative Test Results on Pancake Batter in Glass Vials with 0.05% Sorbic Acid and 0.10% Potassium Sorbate After 1 Week

| Additional Preservatives | Air Headspace | $N_2$ Headspace |
|---|---|---|
| 0.025% Methyl Paraben 0.075% Propyl Paraben | beginning of phase separation pressure build-up sour milk odor | beginning of phase separation pressure build-up sour milk odor masked by paraben odor |
| 0.50% Lactic Acid | phase separation pressure build-up sour milk odor | phase separation pressure build-up sour milk, rancid, off odor |
| 1.00% Lactic Acid | phase separation pressure build-up sour milk odor | beginning of phase separation pressure build-up sour milk odor |

TABLE 3.2

Preservative Test Results on Pancake Batter in Glass Vials with 0.10% Sorbic Acid and 0.20% Potassium Sorbate After 170 Hrs.

| Additional Preservatives | Air Headspace | $N_2$ Headspace |
|---|---|---|
| None | beginning of phase separation pressure build-up sour milk odor | phase separation pressure build-up sour milk odor |
| 200 ppm EDTA | beginning of phase separation pressure build-up sour milk odor | phase separation pressure build-up sour milk odor |
| 500 ppm EDTA | no phase separation pressure build-up sour milk odor | beginning of phase separation pressure build-up sour milk odor |
| 0.10% Na Benzoate | beginning of phase separation pressure build-up sour milk odor | phase separation pressure build-up sour milk odor |
| 0.025% Methyl Paraben 0.075% Propyl Paraben | phase separation pressure build-up sour milk odor masked by paraben odor | no phase separation pressure build-up sour milk odor masked by paraben odor |
| 0.50% Lactic Acid | phase separation pressure build-up sour milk odor | phase separation pressure build-up sour milk odor |
| 1.00% Lactic Acid | phase separation pressure build-up no off odor | beginning of phase separation pressure build-up sour milk odor |

Note:
Pressure build-up was characterized by an audible pressure exhaust when the vial cap was unscrewed.

Example 4

Aim: to study the pressure build-up in pressurized and un-pressurized cans.

Propellants: (i) None; (ii) $CO_2$; (iii) $N_2$. Fill: 8 oz. Hot process, 50° C. (120° F.) DI water+Elite Spice pancake mix. Preservative trials:

1. Un-pressurized crimped 205×604 3-pc steel, EP coated cans with
   a. 0.05% sorbic acid and 0.10% potassium sorbate combo
   b. 0.05% sorbic acid and 0.10% potassium sorbate combo with $N_2$ cap
   c. 0.05% sorbic acid and 0.10% potassium sorbate combo+ 1.00% lactic acid (88%)
   d. 0.05% sorbic acid and 0.10% potassium sorbate combo+ 1.00% lactic acid (88%) with $N_2$ cap
2. Pressurized crimped 205×604 3-pc steel, EP coated cans with
   a. 1.0% sorbates (combination of 0.40% sorbic acid and 0.60% potassium sorbate)
   b. a+200 ppm EDTA
   c. a+500 ppm EDTA
   d. a+0.1% sodium benzoate
   e. a+0.075% propyl paraben+0.025% methyl paraben
   f. a+0.5% lactic acid (88%)
   g. a+1.0% lactic acid (88%)

Results

Figure 2:
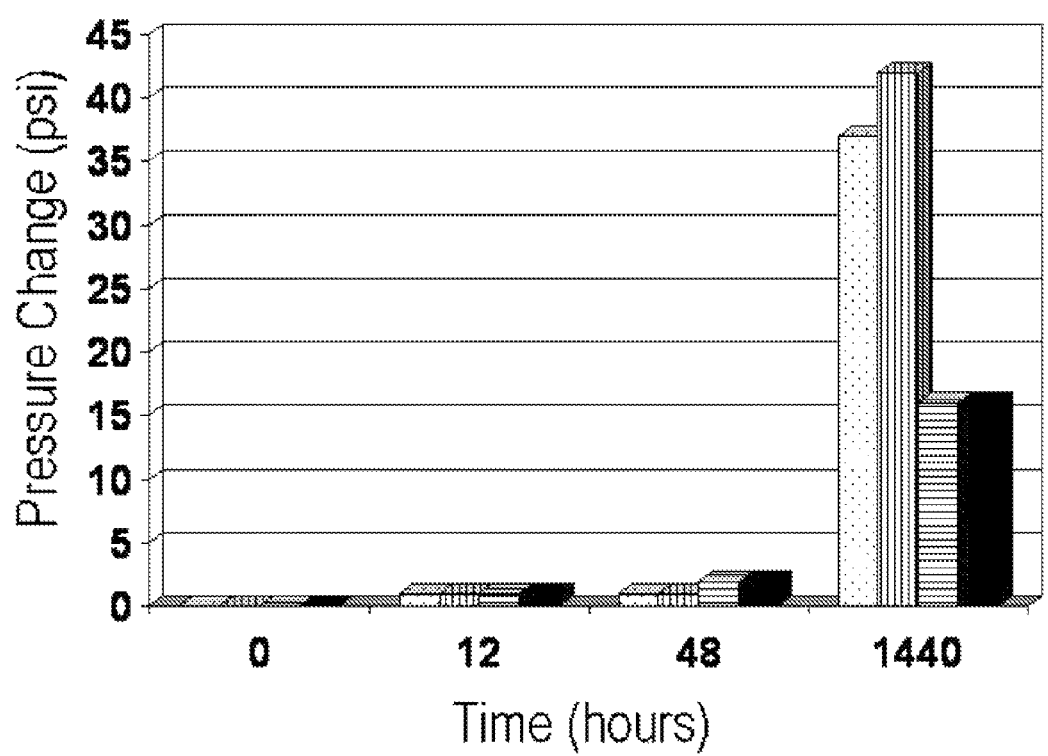
FIG. 2 shows the change in pressure in un-pressurized cans (Dots—0.15% sorbates, no $N_2$ cap; Vertical Lines—0.15% sorbates, $N_2$ cap; Horizontal Lines—0.15% sorbates, 1.0% lactic acid, no $N_2$ cap; Black—0.15% sorbates, 1.0% lactic acid, $N_2$ cap)
Figure 3:
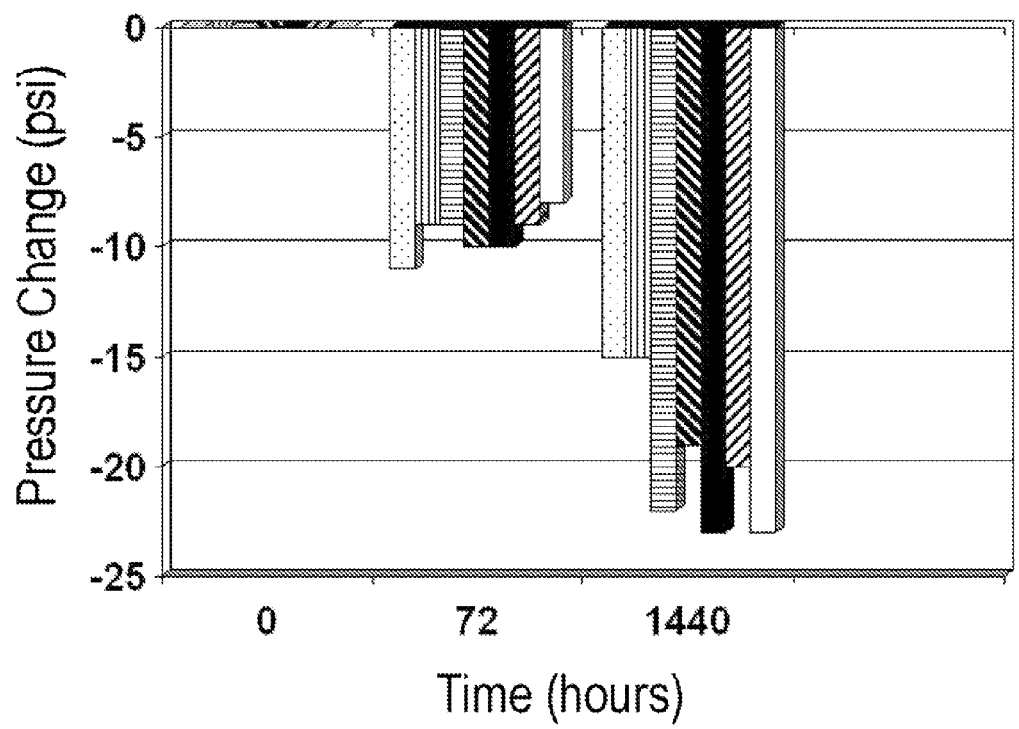
FIG. 3 shows the change in pressure in $CO_2$ pressurized cans (Dots—1.0% sorbates; Vertical Lines—1.0% sorbates, 200 ppm EDTA; Horizontal Lines—1.0% sorbates, 500 ppm EDTA; Diagonal Stripes LtoR—1.0% sorbates, 0.1% sodium benzoate; Black—1.0% sorbates, 0.075% propyl paraben, 0.025% methyl paraben; Diagonal Stripes RtoL—1.0% sorbates, 0.5% lactic acid; White—1.0% sorbates, 1.0% lactic acid)
Figure 4:
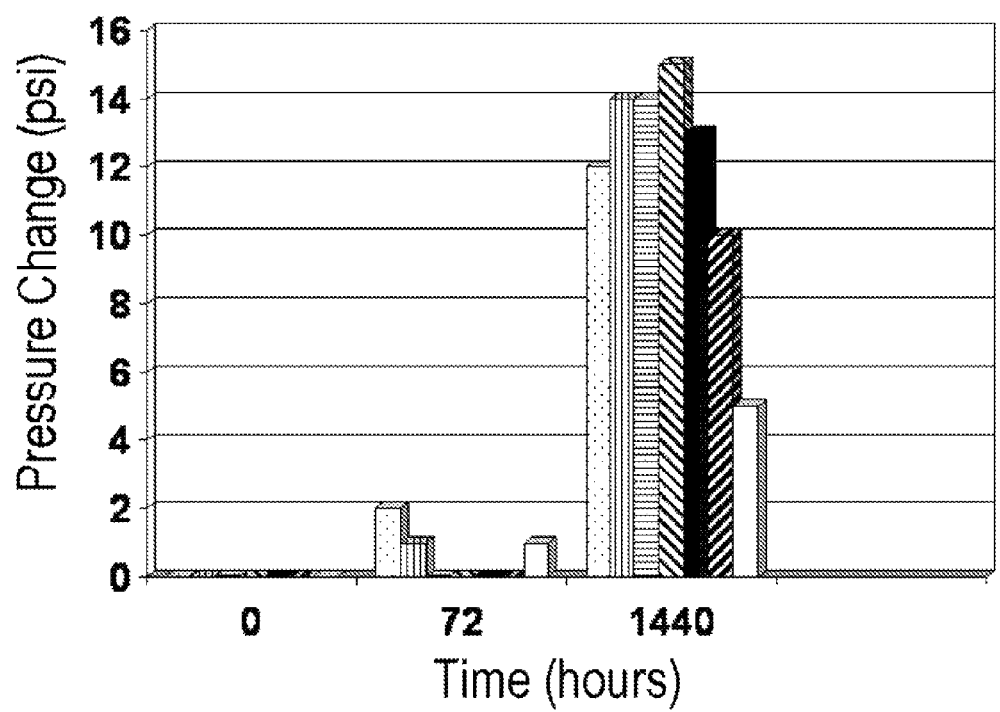
FIG. 4 shows the change in pressure in $N_2$ pressurized cans (Dots—1.0% sorbates; Vertical Lines—1.0% sorbates, 200 ppm EDTA; Horizontal Lines—1.0% sorbates, 500 ppm EDTA; Diagonal Stripes LtoR—1.0% sorbates, 0.1% sodium benzoate; Black—1.0% sorbates, 0.075% propyl paraben, 0.025% methyl paraben; Diagonal Stripes RtoL—1.0% sorbates, 0.5 lactic acid; White—1.0% sorbates, 1.0% lactic acid)

There was a significant pressure build-up in both un-pressurized samples (Dots—0.15% sorbates, no $N_2$ Cap; Horizontal Lines—0.15% sorbates, 1.0% lactic, no $N_2$ Cap) and $N_2$-pressurized samples (Vertical Lines—0.15% sorbates, $N_2$ Cap; Black—0.15% sorbates, 1.0% lactic acid, $N_2$ Cap) after 60 days. On the contrary, $CO_2$-pressurized samples dropped in pressure in the same time frame (Tables 4.1 and 4.2 and FIG. 3). The pressure build-up was more pronounced in the un-pressurized samples (FIG. 2; ~40 psi average after 60 days) than in the $N_2$-pressurized samples (~13 psi average after 60 days) (FIG. 4). And for the un-pressurized set, the samples with sorbates only (Dots—0.15% sorbates, no $N_2$ Cap) result in more than double the final pressure compared to the sample with sorbates+lactic acid preservative system (Horizontal Lines—0.15% sorbates, 1.0% lactic, no $N_2$ Cap) (FIG. 2).

For the samples pressurized with $CO_2$ (Dots—1.0% sorbates; Vertical Lines—1.0% sorbates, 200 ppm EDTA; Horizontal Lines—1.0% sorbates, 500 ppm EDTA; Diagonal Stripes LtoR—1.0% sorbates, 0.1% sodium benzoate; Black—1.0% sorbates, 0.075% propyl paraben, 0.025% methyl paraben; Diagonal Stripes RtoL—1.0% sorbates, 0.5% lactic acid; White—1.0% sorbates, 1.0% lactic acid), the average pressure drop after 60 days was about 29 psi (FIG. 3).

As discussed in Example 3, the probable causes for the build up of pressure in the un-pressurized and $N_2$ pressurized cans can have been (i) evolution of $CO_2$ from the bicarbonate leavening agent and/or (ii) microbial growth/fermentation.

In fermentation of sugars, one of the ingredients of the powder mix, the byproducts are ethanol and $CO_2$. Some of the $CO_2$ is released to the headspace of the can. However, a portion of the $CO_2$ is dissolved in the water which, in effect, acidifies the batter. Additionally, other microorganisms such as lactic acid bacteria which can possibly be present in the mix (see Example 6), can produce acid byproducts such as lactic acid. Such byproducts can cause the batter to acidify. This acidification can then cause the sodium bicarbonate to release further $CO_2$.

The $CO_2$ due to microbial activity or bicarbonate decomposition in the un-pressurized cans produced the headspace pressure (FIG. 2). But when the headspace of the can already had a positive pressure as in the $N_2$ pressurized samples (Dots—1.0% sorbates; Vertical Lines—1.0% sorbates, 200 ppm EDTA; Horizontal Lines—1.0% Sorbates sorbates, 500 ppm EDTA; Diagonal Stripes LtoR—1.0% sorbates, 0.1% sodium benzoate; Black—1.0% sorbates, 0.075% propyl paraben, 0.025% methyl paraben; Diagonal Stripes RtoL— 1.0% sorbates, 0.5% lactic acid; White—1.0% sorbates, 1.0% lactic acid) (FIG. 4), the production of $CO_2$ can have been restricted such that the pressure-build up was less than that in the un-pressurized samples.

On the other hand, un-pressurized and $N_2$-pressurized samples preserved with sorbates combined with lactic acid had the least pressure build-up. And the more lactic acid added, the lower the pressure build-up (FIGS. 2 and 4). Although the lactic acid efficacy cannot completely offset the bicarbonate decomposition due to acidity, it was significantly better as a preservative, in combination with sorbates, than the other preservative systems used.

The $CO_2$-pressurized cans exhibited reversed results and the pressure decreased after 60 days (FIG. 3). One explanation is that some of the $CO_2$ molecules that were injected in the can were dissolved in the water in the mix over time. This explains why the pressure decreased from the day the samples were made. The $CO_2$ generation in these samples cannot have been enough to overcome the amount of $CO_2$ dissolved in the sample. Therefore, the pressure effects of $CO_2$ dissolution were more evident than the effects of $CO_2$ generation. Alternatively, the $CO_2$ can have natural anti-microbial action which impeded or slowed down microorganism growth. For fermentation, the $CO_2$ injected can have saturated the system retarding further $CO_2$ production from yeast. For aerobic microorganisms, $CO_2$ made the environment undesirable for microbial growth.

TABLE 4.1

Pressure Build-up in Un-Pressurized Cans

| Preservative System | $N_2$ Cap | Can Pressure, psi | | |
|---|---|---|---|---|
| | | 12 Hrs | 48 Hrs | 1440 Hrs |
| 0.15% sorbates | no | 0.5-1.0 | ~1.0 | 37 |
| 0.15% sorbates | yes | ~1.0 | ~1.0 | 42 |
| 0.15% sorbates + 1.00% lactic acid | no | ~1.0 | ~2.0 | 16 |
| 0.15% sorbates + 1.00% lactic acid | yes | ~1.0 | ~2.0 | 16 |

TABLE 4.2

Pressure Changes in Pressurized Cans

| | Pressure, psi | | | | | |
|---|---|---|---|---|---|---|
| | 0 Hrs | | 72 Hrs | | 1440 Hrs | |
| Preservative System | $CO_2$-pressurized* | $N_2$-pressurized* | $CO_2$-pressurized | $N_2$-pressurized | $CO_2$-pressurized | $N_2$-pressurized |
| 1.0% sorbates** | 126 | 107 | 115 | 109 | 100 | 121 |
| 1.0% sorbates + 200 ppm EDTA | 120 | 105 | 111 | 106 | 96 | 120 |
| 1.0% sorbates + 500 ppm EDTA | 118 | 112 | 109 | 112 | 87 | 126 |
| 1.0% sorbates + 0.10% sodium benzoate | 122 | 107 | 112 | 107 | 93 | 122 |
| 1.0% sorbates + 0.075% propyl paraben + 0.025% methyl paraben | 122 | 107 | 112 | 107 | 89 | 120 |
| 1.0% sorbates + 0.5% lactic acid | 121 | 107 | 112 | 107 | 92 | 117 |
| 1.0% sorbates + 1.0% lactic acid | 122 | 105 | 114 | 106 | 91** | 111 |

*Amount of propellant used: ~3.30 g $CO_2$ and ~1.70 g $N_2$
**1.0% sorbates is a combination of 0.4% sorbic acid and 0.6% potassium sorbate Example 5

Aim: to study the pressure changes in the can pressurized with 50/50 $CO_2/N_2$ as a follow-up to Example 4.

TABLE 5.1

Sample* Description for the Pressure Build-Up test on Cans Pressurized with 50/50 $CO_2/N_2$ Combo.

| Sample Code | Formula | Propellant | Fill, oz |
|---|---|---|---|
| 06-023 | Waffle formula 50.0% Water 49.5% Elite Spice powder mix (lot 2-27601) 0.5% Guardian CS1-50 (cultured dextrose) | (50/50 $CO_2/N_2$) 2 g $CO_2$ followed with 2 g $N_2$ @ ~120 psi Total 4 g | 18 |
| 06-024 | Pancake formula 52.5% Water 47.0% Elite Spice powder mix (lot 2-27601) 0.5% Guardian CS1-50 | (50/50 $CO_2/N_2$) 2 g $CO_2$ followed with 2 g $N_2$ @ ~120 psi Total 4 g | 18 |

*Samples were stored at room temp for the duration of the study.

TABLE 5.2

Pressure Changes in Cans Pressurized with 50/50 $CO_2/N_2$ Combo

| | Pressure, psi | | | | | |
|---|---|---|---|---|---|---|
| Sample Code | 2 Hrs | 72 Hrs | 264 Hrs | 400 Hrs | 1700 Hrs | Δ Pressure |
| 06-023 | 110 | 109 | 109 | 109 | 121 | +11 |
| 06-024 | 109 | 108 | 107 | 107 | 118 | +9 |

*For Time 0, the pressure reading was taken ~2 to 3 hours after the samples were made Results The pressure build up was similar to the $N_2$-pressurized samples in Example 4 (see FIG. 4 (1.0% sorbates, 0.5% lactic acid), but the amount of product in the cans was increased in this trial. Some of the injected $CO_2$ dissolved in the water but more $CO_2$ (or other gaseous microorganism byproducts) can be generated, causing the pressure increase.

Example 6

Aim: to determine the shelf stability of the batter using trial preservatives. The tests were conducted by BETA Food Consulting, Inc.

Mix: Pancake Batter: 47.5/52.7 Elite Spice Pancake Mix/DI Water. Screw cap glass vials. Primary Preservatives used:

MG510 gassed with $CO_2$
CS1-50 gassed with $CO_2$
MG510 gassed with $N_2$
CS1-50 gassed with $N_2$

TABLE 6.1

Parameters of the micro-study

|  | Batch 1 (Pancake) 50/50 Elite Spice powder mix/Water | Batch 2 (Pancake) 47.5/52.5 Elite Spice powder mix/Water |
|---|---|---|
| Preservative (Cultured Dextrose Maltodextrin) | Microgard 510 (MG510) (lot# 510-425301) | Guardian CS1-50 (lot# FS-102) |
| Preservative Dosage | 0.75% | 0.50% |
| Fill | 18.3 oz | 18.3 oz |
| Can | 214 × 804 | 214 × 804 |
| Temp of finished batch | 65° F. | 55° F. |
| Nitrogen cap | No | yes |
| Codes | V1, V3 | V2, V4 |

Inoculants:
Y—yeast
LAB—lactic acid bacteria
SA—*Staphylococcus aureus*
LM—*Listeria monocytogenes*
BC—*Bacillus cereus*
Results Following is a study conducting a microbiological challenge on aerosolized food product. The pH of the aerosol food product is approximately 6.0 and the water activity is 0.96.

Growth of Selected Spoilage and Pathogenic Organisms in an Aerosol Food Product

Purpose

The purpose of the study is to determine the fate of selected spoilage and surrogates for pathogenic microbial agents when inoculated into an aerosolized food product. Outgrowth of lactic acid bacteria and *Listeria monocytogenes* was problematic in a previous study completed in January 2006. For this reason, they will be the only organisms studied on this formulation. A surrogate organism that is non-pathogenic will be used for *L. monocytogenes* to avoid the potential for contamination of the facility. *Listeria innocua* will be used instead.

Product Variables

The product variables to be studied include:

1) MicroGard 510 with $CO_2$ (waffle)

2) MicroGard CS150 with $CO_2$ (waffle)

3) MicroGard 510 with $N_2$ (pancake)

4) MicroGard CS150 with $N_2$ (pancake).

The intended shelf life is 45-60 days, minimum. No previous stability information had been gathered on the products. The study was continued for 105 days to determine whether a longer shelf life was possible.

Process

The pre-cooled batter was loaded into the cans after filling to minimize shifts in microbial loads. Empty cans were submerged in a 200 ppm chlorine solution for a minimum of 60 seconds prior to draining and permitting to air dry, for the purpose of disinfection. Cans were filled, inoculated, capped with valve tops and pressurized, chilled in an ice bath, and immediately placed into refrigeration temperatures of 4.0° C. (40° F.). Finished cans were stored for 1.5 days and transported in a refrigerated truck.

Organisms

The organisms for challenge represented those of potential safety and spoilage concern. The only pathogen of potential concern that was not represented was *C. botulinum*. The test organism categories included:

*Bacillus cereus* (gram positive spore former, thermo labile toxin)

*Staphylococcus aureus* (gram positive non-spore former, thermo stable toxin)

*Listeria monocytogenes* (gram positive non-spore former, psychrotroph)

*Zygosaccharomyces rouxii* (yeast)

*Lactobacillus formentum, Lactobacillus plantarum* (combined inoculum of gram positive non-spore formers).

Culture Preparation

Lactic acid bacteria was grown in sterile MRS broth. Other bacteria were grown in sterile trypticase soy broth. Yeast extract was added for the *L. monocytogenes* culture. Bacteria were cultured for 24 hours at 35° C., then streaked on trypticase soy agar and incubated for 48 hours at 35° C. Yeast were cultured for 5 days at 24° C. on potato dextrose agar. Cell suspensions were prepared by harvesting cells into sterile 0.1% peptone water. Inoculum was adjusted to deliver a target initial load of $10^3$-$10^4$ cfu/g (minimum 590,000 cfu/can in each 20 fl. oz. can). Inoculation was delivered with a 1 mL inoculum volume. The cans were inoculated in the 'in-house' R & D laboratory bench top capping unit at Follmer Development, located away from the processing area and not used for production. A Food Safety Solutions representative conducted the inoculation.

Sixteen cans for each inoculum group were prepared. Two uninoculated controls were additionally prepared for each of the 4 product variables. Swabs of the bench, utensils, and rinsate from the filler unit were collected after cleaning and sanitization was complete to determine adequacy of cleaning. The unit was not used before results were available.

Test Method

Test methods for quantitation will be per FDA-BAM or AOAC. The changes in loads for each inoculum group will be measured at each test interval. Testing will be done in duplicate. Trend information about growth, death, or stasis will be available from the data.

Test Interval

Test intervals were spaced appropriately to represent the 105 day storage period. Testing was conducted on inoculated variables 1, 2, and 4 at day 2, 15, 30, 45, 60, 75, 90, and 105. Testing for inoculated variable 3 was conducted at day 2, 15, 30, and 45. Later test intervals for variable 3 were discontinued because inoculum loads significantly increased. Uninoculated controls were analyzed after 2 and 105 for variables 1 and 2. An additional 45 day test interval was added for variables 3 and 4 to determine midpoint shifts in background flora levels.

Uninoculated control samples were analyzed for *B. cereus, S. aureus, L. monocytogenes*, lactic acid bacteria, yeast, mesophilic aerobic plate count, and mesophilic anaerobic spore former counts.

Storage Conditions

Products stored at 4° C. (40° F.).

The pathogenic organisms detected in the product after 2-105 days are shown in Tables 6.2-6.9.

TABLE 6.2

Inoculated Variable 1 - MicroGard 510 with $CO_2$ waffle batter

| | Variable 1 $CO_2$ | | | | | | | | | |
|---|---|---|---|---|---|---|---|---|---|---|
| | B. cereus | | S. aureus | | L. monocytogenes | | Lactic acid bacteria | | Yeast | |
| | (cfu/g) | Average Log10 cfu/g | (cfu/g) | Average Log10 Cfu/g | (cfu/g) | Average Log10 cfu/g | (cfu/g) | Average Log10 cfu/g | (cfu/g) | Average Log10 cfu/g |
| Initial (Theoretical) | 1500 | | 14000 | | 8100 | | 4900 | | 8800 | |
| Day 2 | 1000 | 3.0791812 | 9400 | 3.9542425 | 140000 | 4.93701611 | 1000 | 2.9542425 | 26000 | |
| Day 2 | 1400 | | 8600 | | 33000 | | 800 | | 24000 | 4.39794001 |
| Day 15 | 900 | 2.8129134 | 5100 | 3.7363965 | 190000 | 5.11058971 | 340 | 2.8864907 | 10000 | 4 |
| Day 15 | 400 | | 5800 | | 68000 | | 1200 | | 10000 | |
| Day 30 | 550 | 2.7520484 | 5000 | 3.744293 | 40000 | 4.34242268 | 95000 | 5.1222159 | 16000 | 4.1903317 |
| Day 30 | 580 | | 6100 | | 4000 | | 170000 | | 15000 | |
| Day 45 | 310 | 2.4771213 | 7200 | 3.6232493 | 63000 | 5.22141424 | 200000 | 5.0051805 | 12000 | 4.11394335 |
| Day 45 | 290 | | 1200 | | 270000 | | 2400 | | 14000 | |
| Day 60 | 160 | 2.3222193 | 1200 | 3.2671717 | 11000 | 4.31175366 | 25000000 | 7.5740313 | 2300 | 3.78887512 |
| Day 60 | 260 | | 2500 | | 30000 | | 50000000 | | 10000 | |
| Day 75 | 20 | 1.4771213 | 8000 | 4.1139434 | 500 | 3.82930377 | 840000 | 7.5845574 | 5000 | 3.49831055 |
| Day 75 | 40 | | 18000 | | 13000 | | 76000000 | | 1300 | |
| Day 90 | 230 | 2.20412 | 200 | 2.2787536 | 22000 | 4.04336228 | <10000 | 8.2787536 | 7200 | 3.6180481 |
| Day 90 | 90 | | 180 | | 100 | | 190000000 | | 1100 | |
| Day 105 | 340 | 2.469822 | 150 | 2.09691 | 38000 | 4.62324929 | 8000000 | 7.0791812 | 3900 | 3.56229286 |
| Day 105 | 250 | | 100 | | 46000 | | 16000000 | | 3400 | |

TABLE 6.3

Inoculated Variable 2 - MicroGard CS150 with $CO_2$ waffle batter

| | Variable 2 $CO_2$ | | | | | | | | | |
|---|---|---|---|---|---|---|---|---|---|---|
| | B. cereus | | S. aureus | | L. monocytogenes | | Lactic acid bacteria | | Yeast | |
| | (cfu/g) | Average Log10 cfu/g | (cfu/g) | Average Log10 Cfu/g | (cfu/g) | Average Log10 cfu/g | (cfu/g) | Average Log10 cfu/g | (cfu/g) | Average Log10 cfu/g |
| Initial (Theoretical) | | | | | | | | | 8800 | |
| Day 2 | 500 | 2.845098 | 17000 | 4.0232525 | 27000 | 4.36172784 | <100 | 2.30103 | 20000 | 4.21748394 |
| Day 2 | 900 | | 4100 | | 19000 | | 200 | | 13000 | |
| Day 15 | 600 | 2.6532125 | 9000 | 3.7596678 | 33000 | 4.56229286 | 100 | 2.146128 | 11000 | 3.94939001 |
| Day 15 | 400 | | 2500 | | 40000 | | 180 | | 6800 | |
| Day 30 | 430 | 2.6180481 | 2600 | 3.3891661 | 80000 | 4.66574174 | 2200 | 3.0569049 | 13000 | 4.06069784 |
| Day 30 | 400 | | 2300 | | 17000 | | 80 | | 10000 | |
| Day 45 | 240 | 2.39794 | 600 | 3.3617278 | 320000 | 569897 | 120 | 3608526 | 8000 | 3.79239169 |
| Day 45 | 260 | | 4000 | | 680000 | | 8000 | | 4400 | |
| Day 60 | 290 | 2.5740313 | 2000 | 3.0700379 | 13000 | 4.42324587 | <100 | 20 | 8000 | 3.6946052 |
| Day 60 | 460 | | 350 | | 40000 | | <100 | | 1900 | |
| Day 75 | 210 | 2.4313638 | 2600 | 3.161368 | 29000 | 4.49136169 | 500 | 3.6283889 | 3500 | 3.41497335 |
| Day 75 | 330 | | 300 | | 33000 | | 8000 | | 1700 | |
| Day 90 | 390 | 2.6283889 | 100 | 3.0413927 | 27 52000 | 4.83250891 | 40 | 1.544068 | 370 | 2.94694327 |
| Day 90 | 460 | | 2100 | | 84000 | | 30 | | 1400 | |
| Day 105 | 390 | 2.5314789 | 800 | 2.9542425 | 1100000 | 6.04139269 | 12000 | 3.8864907 | 4300 | 3.51851394 |
| Day 105 | 290 | | 1000 | | 1100000 | | 3400 | | 2300 | |

TABLE 6.4

Inoculated Variable 3 - MicroGard 510 with $N_2$ pancake batter

Variable 3 $N_2$

| | B. cereus (cfu/g) | Average Log10 cfu/g | S. aureus (cfu/g) | Average Log10 cfu/g | L. monocytogenes (cfu/g) | Average Log10 cfu/g | Lactic acid bacteria (cfu/g) | Average Log10 cfu/g | Yeast (cfu/g) | Average Log10 cfu/g |
|---|---|---|---|---|---|---|---|---|---|---|
| Initial (Theoretical) | 1500 | | 14000 | | 8100 | | 4900 | | 8800 | |
| Day 2 | 1100 | 2.90309 9 | 4000 | 3.5965971 | 520000 | 5.6580114 | 1000 | 2.7781513 | 14000 | 4.07918125 |
| Day 2 | 500 | | 3900 | | 390000 | | 200 | | 10000 | |
| Day 15 | 900 | 2.8750613 | 5000 | 3.90309 | 2800000 | 6.62324929 | 330 | 2.6283689 | 23000 | 4.52504481 |
| Day 15 | 600 | | 11000 | | 5600000 | | 520 | | 44000 | |
| Day 30 | 480 | 2.607455 | 2300 | 3.50515 | 250000000 | 8.30103 | 110000 | 5.462398 | 18000 | 4.23044892 |
| Day 30 | 330 | | 4100 | | 150000000 | | 470000 | | 16000 | |
| Day 45 | 220 | 2.3222193 | 2800 | 3.4771213 | 82000000 | 7.91645395 | 81000000 | 7.9566486 | 13000 | 4.09691001 |
| Day 45 | 200 | | 3200 | | 83000000 | | 100000000 | | 12000 | |

TABLE 6.5

Inoculated Variable 4 - MicroGard CS150 with $N_2$ (pancake batter)

Variable 4 $N_2$

| | B. cereus (cfu/g) | Average Log10 cfu/g | S. aureus (cfu/g) | Average Log10 cfu/g | L. monocytogenes (cfu/g) | Average Log10 cfu/g | Lactic acid bacteria (cfu/g) | Average Log10 cfu/g | Yeast (cfu/g) | Average Log10 cfu/g |
|---|---|---|---|---|---|---|---|---|---|---|
| Initial (Theoretical) | 1500 | | 14000 | | 8100 | | 4900 | | 8800 | |
| Day 2 | 500 | 2.7403627 | 6500 | 3.7853298 | 320000 | 5.35218252 | <100 | 2 | 16000 | 4.38916608 |
| Day 2 | 600 | | 5600 | | 130000 | | 100 | | 33000 | |
| Day 15 | 500 | 2.6532125 | 5100 | 3.6627578 | 7600000 | 6.68574174 | 80 | 1.9542425 | 22000 | 4.21748394 |
| Day 15 | 400 | | 4100 | | 2100000 | | 100 | | 11000 | |
| Day 30 | 600 | 2.7075702 | 3500 | 3.4313638 | 760000000 | 8.83569057 | 110 | 4.2318517 | 28000 | 4.41497335 |
| Day 30 | 420 | | 1900 | | 610000000 | | 34000 | | 24000 | |
| Day 45 | 250 | 2.3424227 | 2700 | 3.1903317 | 100000000 | 8.04139269 | 1900 | 3.3710679 | 18000 | 4.30103 |
| Day 45 | 190 | | 400 | | 120000000 | | 2800 | | 22000 | |
| Day 60 | 260 | 2.5314789 | 3300 | 3.7520484 | 30000000 | 7.60205999 | 150000 | 5.2671717 | 22000 | 4.26717173 |
| Day 60 | 420 | | 8000 | | 50000000 | | 220000 | | 15000 | |
| Day 75 | 340 | 2.5118834 | 3200 | 3.3617278 | 7000000 | 6.87506126 | 2000000 | 6.062582 | 4800 | 3.44715803 |
| Day 75 | 310 | | 1400 | | 8000000 | | 310000 | | 800 | |
| Day 90 | 380 | 2.5185139 | 28000 | 4.2900346 | 4800000 | 6.8573325 | 1200000 | 5.845098 | 7200 | 3.8920946 |
| Day 90 | 280 | | 11000 | | 9600000 | | 200000 | | 8400 | |
| Day 105 | 250 | 2.3222193 | 160000 | 5.2304489 | 2300000 | 6.31175386 | 250000000 | 8.4771213 | 2400 | 3.98677173 |
| Day 105 | 170 | | 180000 | | 1800000 | | 350000000 | | 17000 | |

TABLE 6.6

Uninoculated Control Variable 1 - MicroGard 510 with $CO_2$ waffle batter

Variable 1 Control

| | B. cereus (cfu/g) | S. aureus (cfu/g) | L. monocytogenes (cfu/g) | Lactic acid bacteria (cfu/g) | Yeast (cfu/g) | Aerobic plate count (cfu/g) | Anaerobic plate count (cfu/g) | Mesophilic anaerobic sporeformer plate count (cfu/g) |
|---|---|---|---|---|---|---|---|---|
| Day 2 | <10 | <10 | <10 | <10 | <10 | 210 | <10 | 140 |
| Day 2 | <10 | <10 | <10 | <10 | <10 | 310 | <10 | 200 |
| Day 105 | <10 | <10 | <10 | 280000000 | <10 | 160000000 | 170000000 | <10 |
| Day 105 | <10 | <10 | <10 | 150000000 | <10 | 8400000 | 10000000 | <10 |

Sample aroma at 105 day interval was acceptable.

TABLE 6.7

Uninoculated Control Variable 2 - MicroGard CS150 with $CO_2$ waffle batter

| | Variable 2 Control | | | | | | | |
|---|---|---|---|---|---|---|---|---|
| | B. cereus (cfu/g) | S. aureus (cfu/g) | L. monocytogenes (cfu/g) | Lactic acid bacteria (cfu/g) | Yeast (cfu/g) | Aerobic plate count (cfu/g) | Anaerobic plate count (cfu/g) | Mesophilic anaerobic sporeformer plate count (cfu/g) |
| Day 2 | <10 | <10 | <10 | <10 | <10 | 110 | <10 | 150 |
| Day 2 | <10 | <10 | <10 | <10 | <10 | 290 | <10 | 120 |
| Day 105 | <10 | <10 | <10 | 40000 | <10 | 1100 | 45000 | <10 |
| Day 105 | <10 | <10 | <10 | 34000 | <10 | 2000 | 50000 | <10 |

Sample aroma at 105 day interval was acceptable.

TABLE 6.8

Uninoculated Control Variable 3 - MicroGard 510 with $N_2$ pancake batter

| | Variable 3 Control | | | | | | | |
|---|---|---|---|---|---|---|---|---|
| | B. cereus (cfu/g) | S. aureus (cfu/g) | L. monocytogenes (cfu/g) | Lactic acid bacteria (cfu/g) | Yeast (cfu/g) | Aerobic plate count (cfu/g) | Anaerobic plate count (cfu/g) | Mesophilic anaerobic spore count (cfu/g) |
| Day 2 | <10 | <10 | <10 | <10 | <10 | 390 | <10 | 140 |
| Day 2 | <10 | <10 | <10 | <10 | <10 | 310 | <10 | 170 |
| Day 45 | <10 | <10 | <10 | 2500000 | <10 | 28000 | 300000 | <10 |
| Day 45 | <10 | <10 | <10 | 2000000 | <10 | 45000 | 400000 | <10 |
| Day 105 | <10 | <10 | <10 | 560000000 | <10 | 280000000 | 560000000 | <10 |
| Day 105 | <10 | <10 | <10 | 390000000 | <10 | 500000000 | 390000000 | <10 |

Sample aroma at 105 day interval was unacceptable (putrid).

TABLE 6.9

Uninoculated Control Variable 4 - MicroGard CS150 with $N_2$ pancake batter

| | Variable 4 Control | | | | | | | |
|---|---|---|---|---|---|---|---|---|
| | B. cereus (cfu/g) | S. aureus (cfu/g) | L. monocytogenes (cfu/g) | Lactic acid bacteria (cfu/g) | Yeast (cfu/g) | Aerobic plate count (cfu/g) | Anaerobic plate count (cfu/g) | Mesophilic anaerobic spore count (cfu/g) |
| Day 2 | <10 | <10 | <10 | <10 | <10 | 150 | <10 | 130 |
| Day 2 | <10 | <10 | <10 | <10 | <10 | 350 | <10 | 130 |
| Day 46 | <10 | <10 | <10 | 39000 | 100 | 1000000 | 1500000 | <10 |
| Day 45 | <10 | <10 | <10 | 34000 | 150 | 550000 | 910000 | <10 |
| Day 105 | <10 | <10 | <10 | 16000000 | 20 | 17000000 | 18000000 | <10 |
| Day 105 | <10 | <10 | <10 | 80000000 | 100 | 80000000 | 52000000 | <10 |

At day 15, no appreciable changes in inoculum loads were observed, with the exception of L. monocytogenes in variables 3 and 4. A small (1 $\log_{10}$) increase occurred between 2 and 15 days. All sample variable results remained acceptable.

At day 30, variable 1 experienced an approximate 2 $\log_{10}$ increase in lactic acid bacteria levels since the last interval (Day 15). All other results did not appreciably change. The net increase in lactic acid bacteria from the initial inoculum levels was about 2 logs, which was still considered acceptable. Variable 2 similarly experienced an increase in lactic acid bacteria, but only by approximately 1 $\log_{10}$. L. monocytogenes and lactic acid bacteria exhibited spikes (approximately 2 log) in counts in variables 3 and 4 (packaged in nitrogen). In order to determine whether the cause was related to background flora activity, the decision was made to test the uninoculated controls at the next test interval (Day 45). All results were considered acceptable after 30 days storage.

After 45 days storage, variable 1 sustained an approximate 2 log overall increase in lactic acid bacteria levels, with 45 day average loads of 5.0 $\log_{10}$. The changes in populations were not unacceptable. Variable 2 experienced a 1 log increase in L. monocytogenes and sustained a 2 log increase in lactic acid bacteria loads. Overall results were acceptable after 45 days storage. Variable 3 experienced an increase of approximately 5 logs in lactic acid bacteria since Day 2, which was considered unacceptable. L. monocytogenes increased by 2-3 $\log_{10}$ since initially inoculated. Counts in inoculated samples for variable 4 did not change appreciably since the last interval (Day 30). Uninoculated control lactic acid bacteria levels were higher in uninoculated control variable 4 than in sample inoculated with lactic acid bacteria, reflecting that previous withdrawal of product from the container (uninoculated control) likely caused elevated counts due to fouling of the nozzle, not changes in the internal product itself. Since the results for variable 3 were poor, testing of the inoculated sample was discontinued. Testing of the uninoculated control was continued, as for other controls. Testing for variables 1, 2, and 4 were continued, as scheduled.

After 60 days of storage, a 2.5 and 2.0 $\log_{10}$ increases in lactic acid bacteria levels were observed in variables 1 and 4, respectively. Results were not indicative of a product failure. No other appreciable changes in microbial loads were observed.

No appreciable changes occurred in microbial loads between 60 and 75 days storage.

After 90 days storage, 0.5 log lactic acid bacteria increase was observed in variable 1. No other changes occurred.

Between 90 and 105 days of storage, *L. monocytogenes* increased by 1 $\log_{10}$ in variable 2 and lactic acid bacteria increased by more than 2 $\log_{10}$. *S. aureus* increased by approximately 1 $\log_{10}$ within the same timeframe.

None of the uninoculated controls had detectable pathogens isolated from them over the 105 day storage period. Chief flora associated with uninoculated controls were lactic acid bacteria. Mesophilic anaerobic spore former counts did not change during the 105 storage period, indicating no need to conduct a follow-up *C. botulinum* inoculation study.

Aroma defects observed in uninoculated controls after 105 days storage were associated with variables 3 and 4, which had higher bacterial loads. Lactic acid bacteria, aerobic plate counts, and anaerobic plate counts in the variables with $N_2$ used as a propellant were extremely high. In the control variables containing $CO_2$ as a propellant, aroma defects were not observed after 105 days storage. Indicator microbe loads were also markedly lower in those variables (1 and 2).

The sum of observation results for aroma indicates the organoleptic endpoint for variables 1 and 2 was beyond 105 days and for variables 3 and 4 it was less than 105 days. The apparent microbiological endpoints are discussed below.

None of the variables supported outgrowth of toxigenic pathogens over the 105 day storage period (*S. aureus*, *B. cereus*). Variables with $N_2$ propellant permitted faster outgrowth of *L. monocytogenes*, to higher levels. Use of $CO_2$ as a propellant appears to suppress *L. monocytogenes* growth, reducing risk of hazard from end-user under cooking.

Overall, the formulation for variable 2, containing Micro-Gard CS150 with $CO_2$ (waffle batter), was most stable against spoilage organisms (uninoculated controls) and *L. monocytogenes* (inoculated samples). Spoilage bacterial levels never exceeded 104 cfu/g during the 105 day storage period in uninoculated controls. The marked spike (approximately 2 $\log_{in}$) between 90 days and 105 days in *L. monocytogenes* levels for the inoculated sample variable 2 reflect the microbiological endpoint for variable 2 could conservatively be set at 90 days.

The spike in lactic acid bacteria (2.5 $\log_{in}$) between 45 and 60 days for variable 1 indicates stability begins to decline. Since the organoleptic endpoint (uninoculated control) was beyond 105 days, a conservative endpoint for variable 1 could be set at 60 days.

The microbiological shelf life endpoint for inoculated variable 3 was 30 days, based on marked changes in lactic acid bacteria levels after that time.

The aroma for uninoculated variable 4 was objectionable after 105 days storage. The endpoint would have been sooner, but was not determined. Based on the microbiological results, a conservative endpoint for the lactic acid bacteria might be 60-75 days, based on substantial increases at those intervals.

A mix of propellant gases ($N_2$ and $CO_2$) would likely result in better stability than $N_2$ alone.

The resident organism in the batter using Elite Spice Pancake Mix is lactic acid bacteria. This organism is not pathogenic and the only concern is aroma defect when present in high loads.

Based on the data, variable 2 (CS150 gassed with $CO_2$) was the most stable against spoilage organisms. None of the variables supported outgrowth of toxigenic pathogens over the 105 day storage period (*S. aureus*, *B. cereus*). Variables with $N_2$ propellant permitted faster outgrowth of *L. monocytogenes*, to higher levels but the use of $CO_2$ as a propellant appears to suppress *L. monocytogenes* growth, reducing risk of hazard from end-user under baking the product while cooking.

Example 7

Aim: to monitor the weight losses in samples

The samples tested were pancake batter and waffle batter formulations with the pancake batter gassed with 3.5 g gas (30% $CO_2$ and 70% $N_2$) and the waffle batter gassed with 7.0 g $CO_2$. All the samples were in 214×804 cans. The samples were kept at room temperature throughout the test.

TABLE 7.1

Age of Samples Tested for Example 7

| | Description | Prepared | Out of the refrigerator Date | Age, days |
|---|---|---|---|---|
| 05-167 | waffle formula with 7.0 g $CO_2$ | Sep. 29, 2005 | Mar. 1, 2006 | 153 |
| 05-203 | waffle formula with 7.0 g $CO_2$ | Dec. 14, 2005 | Mar. 1, 2006 | 77 |
| 06-017 | pancake formula with 3.5 g gas (30% $CO_2$ and 70% $N_2$) | Feb. 16, 2006 | Mar. 1, 2006 | 13 |
| 06-018 | pancake formula with 3.5 g gas (30% $CO_2$ and 70% $N_2$) | Feb. 16, 2006 | Mar. 1, 2006 | 13 |

Results

TABLE 7.2

Weight Monitoring of Pancake and Waffle Aerosol Cans

| | Weight, grams | | | | | |
|---|---|---|---|---|---|---|
| Day | 0 | 2 | 5 | 9 | 13 | Δ Weight |
| 05-167 | 642.0 | 641.9 | 641.8 | 641.5 | 641.5 | −0.5 |
| 05-203 | 643.8 | 643.8 | 643.8 | 643.7 | 643.7 | −0.1 |
| 06-017 | 637.6 | 637.6 | 637.5 | 637.6 | 637.5 | −0.1 |
| 06-018 | 636.6 | 636.6 | 636.5 | 636.5 | 636.5 | −0.1 |

After 13 days, there was no significant weight loss (or leak) from the can. The weight loss observed can have been due to leakage of gas when pressure readings were taken. The packaged batter does not pose any leaking problem. The valve, crimp and can specifications are appropriate for use in this application.

Example 8

Aim: to determine the density of the batters

Formula: 47.5 powder mix/52.5 water; Cold process (water temperature is 50° F.; finished batter is 61° F.); Preservatives: 0.05% sorbic acid and 0.10% potassium sorbate combo; Graduated cylinder method.

Results

Calculated density: 1.33 g/mL at approximately 16° C. (61° F.). The suspended solids made the product denser. A cold process is more appropriate for the batter preparation. Higher temperature will cause the sodium bicarbonate to decompose and the leavening effect lost.

Example 9

Aim: to determine the effect of mixing time on the viscosity of the batter.

Formula: 50/50 Elite Spice Pancake Mix 18636AO/Water. Viscosity measurements were taken throughout the mixing time of the batter. The viscometer used was Brookfield DV-II+ viscometer.

TABLE 9.1

Effect of Time of Mixing to the Viscosity of the Batter

| Time, mins | Viscosity, cP* | Temperature, ° F. |
|---|---|---|
| 2 | 15,000 | 60.0 |
| 4 | 16,000 | |
| 6 | 15,000 | |
| 8 | 14,500 | |
| 10 | 13,500 | 61.3 |
| 12 | 13,300 | |
| 14 | 12,750 | 63.0 |
| Mixing stopped at 14 mins. Batter was stored at ~4 ± 2° C. (40 ± 2° F.) for 15 minutes. Timer is restarted | | |
| 0 | 17,000 | 53.0 |
| 30 | 15,600 | 60.5 |
| 60 | 15,200 | 64.5 |

*RV Spindle #6 at 20 rpm, 1 minute

Results

The data show that the batter exhibits a non-Newtonian property which is thixotropic. As a result, shear (mixing) decreases the viscosity but recovers its original viscosity after the applied shear is reduced or removed. Accordingly, extended mixing of the batter to achieve homogeneity during process cannot be detrimental to the final mix.

Example 10

Aim: to determine delivery weight of batter in pressurized container.

Fill: 22 oz; Pressure: 130 psi (2.6 g $N_2$); Can: 214×804; Valve: S63 3×022" Summit Whipped Cream Valve (Summit)+Whipped Cream Actuator; the spray-out was not intermittent.

Results

Total delivery weight from a 22 oz filled 214×804 can is approximately 18 oz. Spraying the product out of the can at once leaves approximately 18% in the can. This high retention weight is due to the viscosity of the batter. The flow of the product is slow and has the tendency to cling to the sides of the can. The propellant is exhausted even before most of the product is expelled from the can.

Example 11

Aim: to determine the delivery weight of batter from a 211×713 can filled to 18 oz.

Formula: Waffle (50/50 Elite Spice Pancake Mix/Water); Can: 211×713, 3-piece Valve: S63 3×0.022" (tilt action) (Summit) Whipped Cream Valves+Whipped Cream Actuator; fill: 18 oz; Propellant: 3 g (50/50 $CO_2/N_2$); Order of gassing: $CO_2$ first to achieve 1.5 g, then $N_2$ with regulator set at 140 psi. At this pressure, 1.5 g $N_2$ is injected in the can; Storage: Refrigerator at 4±2° C. (40±2° F.) for 2 days.

The product was dispensed while cold until gas starts to come out of the nozzle. The can was shaken to dispense more product.

TABLE 11.1

Delivery Weight of an 18 oz Batter Filled 211 × 713 Can

| Amount Delivered, g | Condition |
|---|---|
| 316 | Gas comes out for the first time |
| 434 | After shaking; more product was dispensed until gas came out. |
| 440 | When consumer is likely to stop trying to dispense more product |

Total delivery weight from an 18 oz filled 211×713 can is approximately 440 g or 15.5 oz. Retention weight is approximately 2.5 oz.

Results

Contrary to the procedure carried out in Example 10, the delivery was maximized by shaking the can, the retention is still approximately 13%. This is due to the viscous characteristic of the batter (as discussed in Example 10).

Example 12

Aim: to determine the delivery weight of batter from a 211×713 can with a S63 3×0.030" tilt action valve filled with 23 oz high water ratio batter.

Base formula: 40/60 Elite Spice Pancake Mix 18636AO/Water; Fill: 23 oz in 214×804 3-piece can; Valve: S63 3×0.030" tilt action valve+Whipped Cream Actuator (Summit).

Propellant: (i) Pancake is gassed with ~2.2 g (50/50 $CO_2/N_2$); Order of gassing: $CO_2$ first to achieve 1.1 g, then $N_2$ with regulator set at 125 psi. At this pressure, 1.1 $N_2$ is injected in the can; (ii) Waffle is gassed with 4.3 g $CO_2$ with the regulator set at 170 psi.

TABLE 12.1

Delivery Weight of High Water Ratio Batter in a Can with a S63 3 × 0.030" Valve Filled at 23 oz.

| | Delivery weight, g | % Delivered |
|---|---|---|
| Pancake | 20.9 | 90.9 |
| Waffle | 19.8 | 86.1 |

Results

Less viscous batter flowed better inside the can such that more product is expelled before the propellant is exhausted. This in effect increased the product yield from the can.

Example 13

Aim: to determine the spray rate of product using different valves.

Can: 214×804, 3-piece; Fill: 18 oz.

Valves Tested: (i) SV-77/HF 2×0035"×0.090" (vertical action) (Summit)+Whipped Cream Actuator; (ii) S63 3×0.030" (tilt action) Whipped Cream Valve (Summit)+Whipped Cream Actuator; (iii) S63 3×0.022" (tilt action) Whipped Cream Valve (Summit)+Whipped Cream Actuator.

Formulas: (i) for Valve 1, Waffle (50/50 Elite Spice Pancake Mix/Water) with 0.75% Microgard MG510; (ii) for Valve 2, Sample Code 06-159, 40/60 Elite Spice Pancake Mix 18636AO/Water; for Valve 3, Waffle (50/50 Elite Spice Pancake Mix/Water) with 0.75% Microgard MG510.

Propellant: (i) for Valve 1, 4 g (50/50 $CO_2/N_2$); Order of gassing: $CO_2$ first to achieve 2 g, then $N_2$ with regulator set at 125 psi. At this pressure, 2 g $N_2$ is injected in the can; (ii) for Valve 2, approximately 7.0 g $CO_2$; regulator pressure set at 170 psi; (iii) for Valve 3, 4 g (50/50 $CO_2/N_2$); Order of gassing: $CO_2$ first to achieve 2 g, then $N_2$ with regulator set at 125 psi. At this pressure, 2 g $N_2$ is injected in the can.

Storage: Refrigerator at 4±2° C. (40±2° F.) for 3 days. Spray rates were taken at 10 seconds per spray.

TABLE 13.1

Spray Rate of Waffle batter (i) Using the Valve SV-77/HF 2 × 0.035" × 0.090" (vertical action) (Summit)

|  | Spray Rate, g/s |
| --- | --- |
| First spray | 21.7 |
| Second spray* | 21.2 |

The delivery weight for this sample is 12.5 oz**
*Second spray lasted for only 6.5 seconds until air started to come out.
**The delivery rate was not maximized. More product could be yielded by shaking the can. This was not done in this trial.

TABLE 13.2

Spray Rate of Waffle batter (ii) Using the Valve S633 × 0.030" (tilt action) whipped cream valve (Summit)

|  | Spray Rate, g/s |
| --- | --- |
| First spray | 16.1 |

TABLE 13.3

Spray Rate of Waffle batter (ii) Using the Valve S63 3 × 0.022" (tilt action) Whipped Cream Valve (Summit)

|  | Spray Rate, g/s |
| --- | --- |
| First spray | 9.2 |
| Second spray | 7.6 |
| Third spray | 6.7 |
| Fourth spray | 6.0 |
| Fifth spray*** | 6.7 |
| Sixth spray**** | 6.1 |

The delivery weight for this sample is 13.6 oz*****
***Fifth spray was 10 mins. apart from the fourth spray while the can is left at room temperature.
****Sixth spray was 10 mins. apart from the fifth spray while the can is left at room temperature. Sixth spray lasted for only 5 seconds until air started to come out.
*****As in Table 13.1, the delivery rate was not maximized. More product could be yielded by shaking the can. This was not done in this trial.

Results

The wide open valve SV-77/HF 2×0.035"×0.090" (Table 13.1) delivered a faster spray rate but yielded only 12.5 oz of product (although this amount was not maximized by shaking the can). The spray rate through the valve overcame the product flow inside the can. The valve S63 3×0.022" (Table 13.3) had a smaller orifice therefore having a slower spray rate but yielding around 1 oz more in delivery weight (also not maximized). The valve with slightly wider the orifice size to 3×0.030" (Table 13.2) delivered a faster spray rate. This test only had one data point and no other parameters were tested.

Example 14

Aim: to set the filling parameters of products using the gasser-crimper.

Pancake and waffle products were filled at different fill weights and ran through the gasser-crimper (Terco, Inc.) varying gassing pressure and time and crimping pressure. The valves used were: (i) S63 3×0.030" Tilt Action Valve+Whipped Cream Actuator (Summit); (ii) 3400 2×0.045"×0.037" Whipped Cream Valve and Actuator (Clayton); (iii) 5477 Unrestricted Flow Whipped Cream Valve and Actuator (Clayton).

TABLE 14.1

Gasser-Crimper Data for Pancake batter (High Fill)
Gassed with $CO_2$ at 150 psi for 2 to 4 seconds
with a Crimper Pressure of About 100 psi

| Sample # | Fill, oz. | Valve | $CO_2$ injected, g | Gassing time, sec | Initial pressure, psi | Pressure after 1 day, psi | Results and Spray rates, g/s |
| --- | --- | --- | --- | --- | --- | --- | --- |
| 01 | 23.0 | 3400 | 3.2 | 2 | | | |
| 02 | 22.6 | 3400 | 3.4 | 2 | | | |
| 03 | 22.5 | S63 3 × 0.030" | 3.5 | 2 | 98 | 62 (shaken) | 7.46 |
| 04 | 22.6 | S63 3 × 0.030" | 3.4 | 2 | | 90 (not shaken) | |
| 05 | 22.3 | S63 3 × 0.030" | 3.6 | 2 | | | |
| 06 | 22.3 | S63 3 × 0.030" | 3.9 | 4 | 106 | | |
| 07 | 22.3 | S63 3 × 0.030" | 3.9 | 4 | | | |
| 08 | 21.8 | S63 3 × 0.030" | 3.6 | 2 | | | |
| 09 | 21.7 | S63 3 × 0.030" | 3.6 | 2 | | | |
| 10 | 22.2 | S63 3 × 0.030" | 5.0 | (Manual) | | | 10.8 (refrigerated) |
| 11 | 22.2 | S63 3 × 0.030" | 7.0 | (Manual) | | | 13.0 (not refrigerated) |

TABLE 14.2

Gasser-Crimper Data for Waffle batter (Various Fill Weights) with S63 3 × 0.030" Whipped Cream Valve (Summit) Gassed with $CO_2$ at 150 psi for 4 seconds with a Crimper Pressure of About 110 psi

| Sample # | Fill oz. | $CO_2$ injected, g | Initial pressure, psi | Following pressure data, psi | Spray rates, g/s, and other Results |
|---|---|---|---|---|---|
| 12 | 18.0 | 5.9 | | | |
| 13 | 18.0 | 5.8 | 125 | 106 (6 days) | |
| 14 | 18.0 | 5.4 | | | |
| | | Average: 5.7 | | | |
| 15 | 19.0 | 5.1 | | | |
| 16 | 19.0 | 5.2 | 120 | | |
| 17 | 19.0 | 5.3 | | | |
| 18 | 19.0 | 5.2 | | | 12.75 (after 5 days) |
| | | Average: 5.2 | | | |
| 19 | 20.0 | 5.0 | 125 | 111 (overnight) shaken to 68 | Retention weight: 1.3 oz |
| 20 | 20.0 | 5.0 | | | |
| 21 | 20.0 | 5.0 | | | |
| 22 | 20.0 | 5.1 | | | |
| 23 | 20.0 | 5.0 | | | |
| | | Average: 5.0 | | | |
| 24 | 17.6 | 6.0 | | | |
| 25 | 21.0 | 4.6 | | | |
| 26 | 21.0 | 4.7 | | | |
| | | Average: 4.6 | | | |

TABLE 14.3

Gasser-Crimper Data for 20 oz Waffle with 3400 Clayton Valve Gassed with $CO_2$ at 150 psi for 2 to 4 seconds with a Crimper Pressure of About 115 psi

| Sample # | Fill, oz. | $CO_2$ injected, g | Gassing time, sec | Spray rates, g/s |
|---|---|---|---|---|
| 27 | 20.0 | 4.9 | 4 | shaken: 22.0, 21.7 overnight: 12.5 |
| 28 | 20.0 | 5.1 | 4 | overnight: 18.0 |
| 29 | 20.0 | 4.9 | 4 | |
| 30 | 20.0 | 4.7 | 2 | shaken, overnight: 13.0 |
| | | Average: 4.9 | | |

TABLE 14.4

Gasser-Crimper Data for 20 oz. Waffle batter with 5477 Clayton Valve Gassed with $CO_2$ at 150 psi for 2 seconds with a Crimper Pressure of About 115 psi

| Sample # | Fill, oz. | $CO_2$ injected, g | Spray rates, g/s |
|---|---|---|---|
| 31 | 20.0 | 5.3 | 28.0 |
| 32 | 20.0 | 5.2 | |
| 33 | 20.0 | 5.1 | |
| 34 | 20.0 | 5.2 | |
| 35 | 20.0 | 5.3 | |
| 36 | 20.0 | 5.2 | |
| 37 | 20.0 | 5.2 | |
| 38 | 20.0 | 5.2 | |
| 39 | 20.0 | 5.3 | |
| 40 | 20.0 | 5.3 | |
| | | Average: 5.2 | |

Results

As the fill weight of the product is reduced, the more gas is accommodated in the can (Tables 14.1 and 14.2). The gassing capability of the plant maxes at around 5.2 g $CO_2$ for can filled with 20 oz of batter. The desired fast/high delivery weight is achievable by using a high flow valve such as Clayton's 5477 (Table 14.4).

The mechanism of the gasser-crimper depends highly on the pressure of the propellant injected, the length of time of gassing, the headspace in the can available for the propellant, and the crimping pressure. Some of these parameters were varied and the results were very conclusive.

$CO_2$ Pressure

Due to the gasser-crimper's limitation, the $CO_2$ injection pressure was maxed at 150 psi to introduce the maximum amount of $CO_2$ into the headspace of the batter.

Length of Time of Gassing

This parameter was varied from 2 to 4 seconds. As the point of entry of the gas is through the wide-open 1-inch mouth of the can, there was no restriction in gassing and extending the length of time of gassing hardly increased the amount of $CO_2$ injected (Tables 14.1 and 14.3), Headspace of the Can In any can, the lesser the product contained in the can, the higher the headspace available. For the 214×804 can, filling the can with 18 oz of batter leaves about 400 mL headspace and filling it with 20 oz reduced the headspace by about 10% (355 ml). 18 oz filled cans can hold about 5.7 g $CO_2$ while 20 oz filled cans can hold about 5.0 g $CO_2$ (Table 14.2).

Crimping Pressure

This is the pressure that counters the $CO_2$ or gassing pressure. Increasing the crimping pressure will prevent some of the $CO_2$ already situated in the headspace of the can from escaping. If this pressure is lower, some of the $CO_2$ will evacuate the headspace until the countering crimp pressure is able to descend and fasten the valve on the can. (See Table 14.2 20 oz and Table 14.4).

Example 15

It was observed that a sample gassed with $CO_2$ was also suitable to make light and fluffy pancakes. Previously (see Example 1) it was observed that the dissolved $CO_2$ escaped the batter during the cooking process making the pancakes flat and thin. Previously, the sample gassed with $N_2$ made better pancakes than the one gassed with $CO_2$. The $N_2$ pressurized the can, but did not really get absorbed or mixed in the water/batter. The batter dispensed was therefore denser and made thicker, sponge-like pancakes similar in appearance and texture to normal pancakes. By changing the recipe, including the water to powder ratio (43% water by weight) and charging the can with more carbon dioxide (5.5 g) it has been possible to obtain light and fluffy pancakes and light and crispy waffles with the same mix. The test candidate preferred the light and fluffy pancakes over the denser pancakes made with the nitrogen filled can and the older mix.

Process Parameters

Product was prepared as shown in Table 15.1. Product was stored at 4° C. (40° F.). Sampling occurred everyday for 14 days. On the 13$^{th}$ day the product had a sour taste, off flavor, odor and a foamy texture.

Product was prepared as shown in Table 15.2. Product was stored at under 4° C. (40° F.). Sampling occurred everyday for 14 days. On the 119$^{th}$ day the product did not have a sour taste, off flavor, odor and a foamy texture.

Conclusion: the temperature that the samples that were packed at materially affects the integrity of the product when stored for long durations at below 40° F. It is speculated that the cold processing inhibits the transfer and or growth of bacteria prior to packaging in the cans.

TABLE 15.1

Process Preparation for integrity of storage study

| | Waffle batter | Pancake batter |
|---|---|---|
| Mixing | | |
| Amount | 523.91 lbs | 523.91 lbs |
| Mixing Process | Mixed in a 60 gal tank with a two blade mixer (manually varied height before circulating pump was set up) Additional mixing with a lab-mixer (hand held) Circulating pump | Mixed in a 60 gal tank with a two blade mixer (manually varied height before circulating pump was set up) Additional mixing with a lab-mixer (hand held) Circulating pump |
| Mixing Time | Addition of ingredients (while mixing): 60 mins Mixing (without circulating pump): 30 mins Stand-by time (pump installation): 30 mins Circulating pump: 60 mins TOTAL: 180 minutes | Total mixing time including addition of ingredients while mixing and while circulating pump is on: 180 minutes |
| Sequence of addition of ingredients | Water Powder Mix (dried whole egg, soybean powder, sodium bicarbonate, salt, cultured dextrose maltodextrin, dicalcium phosphate, xantham gum) Sugar Wheat flour | Water Powder Mix (dried whole egg, soybean powder, sodium bicarbonate, salt, cultured dextrose maltodextrin, dicalcium phosphate, xantham gum) Sugar Wheat flour |
| Mixing temperature | 70° F. | 70° F. |
| Finished batch temperature | 70° F. | 75° F. |
| Filling | | |
| Fill | 20 oz | 20 oz |
| CO$_2$ weight | 5.2 g average | 5.4 g average |
| Can Pressure | ~130 (start) ~115 (overnight, no shaking) | ~130 (start) ~115 (overnight, no shaking) |

TABLE 15.2

Cold Process Preparation for integrity of storage study

| | Waffle batter | Pancake batter |
|---|---|---|
| Mixing | | |
| Amount | 523.91 lbs | 523.91 lbs |
| Mixing Process | Mixed in a 60 gal tank with a two blade mixer (manually varied height before circulating pump was set up) Additional mixing with a lab-mixer (hand held) Circulating pump | Mixed in a 60 gal tank with a two blade mixer (manually varied height before circulating pump was set up) Additional mixing with a lab-mixer (hand held) Circulating pump |
| Mixing Time | Addition of ingredients (while mixing): 60 mins Mixing (without circulating pump): 30 mins Stand-by time (pump installation): 30 mins Circulating pump: 60 mins TOTAL: 180 minutes | Total mixing time including addition of ingredients while mixing and while circulating pump is on: 180 minutes |
| Sequence of addition of ingredients | Water Powder Mix (dried whole egg, soybean powder, sodium bicarbonate, salt, sodium lactate, dicalcium phosphate, rice bran) Sugar Wheat flour | Water Powder Mix (dried whole egg, soybean powder, sodium bicarbonate, salt, sodium lactate, dicalcium phosphate, rice bran) Sugar Wheat flour |
| Mixing temperature | 39° F. | 39° F. |
| Finished batch temperature | 40° F. | 40° F. |
| Filling | | |
| Fill | 20 oz | 20 oz |
| CO$_2$ weight | 5.2 g average | 5.4 g average |
| Can Pressure | ~130 (start) ~115 (overnight, no shaking) | ~130 (start) ~115 (overnight, no shaking) |

Example 16

Product was prepared as shown in Table 16.1. Product was stored at 4° C. (40° F.). 20 oz. cans 567.0 g product and 5.5 g CO$_2$. Report from BETA Food Consulting, Inc.

Following is a study conducting a microbiological challenge study on the revised formula of the aerosolized food product (Table 16.1). The pH of the aerosol food product is approximately 6.5-7.5 and the water activity is 0.96.

Growth of Selected Spoilage and Pathogenic Organisms in an Aerosol Food Product

Purpose

The purpose of the study is to determine the fate of selected spoilage and surrogates for pathogenic microbial agents when inoculated into an aerosolized food product. Outgrowth of lactic acid bacteria and *L. monocytogenes* was problematic in Example 4. For this reason, these organisms are studied in this formulation. A surrogate organism (*L. innocua*) that is non-pathogenic will be used instead of *L. monocytogenes* to avoid potential contamination of facility.

Product Variable

The product to be studied is given in Table 16.1; the variable addressed is the use of sodium lactate with CO$_2$.

The intended shelf life is 45-60 days, minimum. The study will assess stability for as long as 120 days.

Process

The batter temperature is 7° C. (45° F.) or below at the time of filling the cans. Empty cans will be disinfected per the process set-up, with chlorine at 50-200 ppm. Filled cans will be removed from the line before installation of the gas valves. They will immediately be transported to the in-house laboratory for inoculation, before having the valve tops installed and gas applied. Finished cans will be stored and transported to Food Microbiological Laboratories by Follmer Development in a refrigerated truck.

Organisms

The organisms for challenge should represent those of potential safety and spoilage concern, as demonstrated in the previous study. No mesophilic spore former activity was noted in the previous study, indicating *C. botulinum* should not be problematic.

The test organism categories will include:
1. *Listeria innocua* (non-pathogenic surrogate organism for *L. monocytogenes* (gram positive non-spore former, psychrotroph).
2. *Lactobacillus fermentum, Lactobacillus plantarum* (combined inoculum of gram positive non-spore formers).

Culture Preparation

Lactic acid bacteria will be grown as a lawn on sterile MRS agar. *L. innocua* will be grown on sterile trypticase soy agar with yeast extract. Bacteria will be cultured for 24 hours at 35° C., then streaked again on trypticase soy agar and incubated for 48 hours at 35° C. The cells will be prepared by harvesting cells into sterile 0.1% peptone water.

Inoculum will be adjusted to deliver a target initial load of 103-104 cfu/g (minimum 590,000 cfu/can in each 20 fl. oz. can). Inoculation will be delivered with a 1 ml inoculum volume. The cans will be inoculated in the in-house laboratory at Follmer Development on the R & D laboratory bench top capping unit that is remote from the processing area and not used for production. A Food Safety Solutions representative will assist with inoculation at the facility in Thousand Oaks, Calif.

Sixteen cans for each inoculum group will need to be prepared. Sixteen uninoculated control cans are also necessary. The customer will be responsible for adequate cleaning and sanitization of the bench top filling unit. Swabs of the bench, utensils, and rinsate from the valve application and gas charging unit will be collected after cleaning and sanitization is complete. The unit should not be used before results reflect inoculum organisms have been adequately removed.

Test Method

Test methods for quantitation will be per FDA-BAM or AOAC. The changes in loads for each inoculum group will be measured at each test interval. Testing will be done in duplicate. Trend information about growth, death, or stasis will be available from the data.

Test Interval

Test intervals will be spaced appropriately to represent a 120 day storage period. Testing will be conducted on inoculated variables at day 2, 30, 45, 60, 75, 90, 105 and 120. Uninoculated controls will be analyzed at 2, 45, 60, 75, 90, 105 and 120.

Uninoculated control samples will be analyzed to determine background spoilage flora response, and also for absence of *L. innocua*. They will be analyzed for *L. innocua*, lactic acid bacteria, yeast, mesophilic aerobic plate count, and mesophilic anaerobic spore former counts.

Storage Conditions

Products will be stored at 4° C. (40° F.).

Product

The constituents of the product to be tested are shown in Table 16.1.

TABLE 16.1

Product Constituents

| Ingredients | Batch % | Target Batch # | Equiv. Wt. g |
|---|---|---|---|
| Water | 40.3609% | 8.88 | 4036-090 |
| Wheat Flour (white, all-purpose, enriched, unbleached) | 34.3302% | 7.60 | 3453.020 |
| Sugars. Granulated | 12.3860% | 2.72 | 1238.600 |
| Egg, Whole, Dried | 2.6075% | 0.57365 | 260.750 |
| Organic Soybean Powder | 1.5645% | 0.34419 | 156.45000 |
| Bakeshire 187 (Sodium Bicarbonate) | 1.1734% | 0.26 | 117.340 |
| Salt | 0.6519% | 0-14 | 63.190 |
| SL.-75A Sodium Lactate (60%) | 3.0000% | 0.66000 | 300.000 |

TABLE 16.1-continued

Product Constituents

| Ingredients | Batch % | Target Batch # | Equiv. Wt. g |
|---|---|---|---|
| Dicalcium Phosphate Dihydrate | 3.5100% | 0.77220 | 351.000 |
| Ribus Nu-bake | 0.1956% | 0.04303 | 19.360 |
| TOTALS: | 100.0000% | 22.00 | 10000.00 |

The pathogenic organisms detected in a product spiked with the organism and tested after a given number of days is shown in Table 16.2. The pathogenic organisms detected in a control sample not spiked with the organism and tested after a given number of days is shown in Table 16.3.

TABLE 16.2

Pathogenic Organisms detected in spiked product

| | Sodium lactate w/$CO_2$ | | | |
|---|---|---|---|---|
| | *L. innocua* | | Lactic acid bacteria | |
| Test interval | (cfu/g) | Average $Log_{10}$ cfu/g | (cfu/g) | Average $Log_{10}$ cfu/g |
| Initial (Theoretical) | 30000 | | 170000 | |
| Day 2 | 2600 | 3.38916608 | 7600 | 3.81291336 |
| Day 2 | 2300 | | 5400 | |
| Day 30 | 830 | 3.04758468 | | |
| Day 30 | 1500 | | | |

TABLE 16.3

Pathogenic Organisms detected in unspiked product
Variable 1 Control

| | *Listeria* Genus/ (25 g) | Lactic acid bacteria (cfu/g) | Aerobic plate count (cfu/g) | Mesophilic anaerobic spore former count (cfu/g) |
|---|---|---|---|---|
| Day 2 | Negative | 280 | 230 | <10 |
| Day 2 | Negative | 290 | 160 | <10 |

Example 17

Viscosity Enabler

Product was prepared in 20 oz cans, 567.0 g product and 5.5 g $CO_2$) or alternatively was a commercially available (Aunt Jemima®) batter prepared according to the directions. Both products were stored at approximately 4° C. (40° F.).

The batter needs to flow at a certain rate for an optimal product. Thus it needs a certain viscosity. In an embodiment of the invention, the $CO_2$ is used to insure that the product does not separate or degrade and the viscosity remains relatively stable as shown in Table 17.1.

TABLE 17.1

Comparison of Viscosity of Pressurized product with commercial pancake mix

| | Carbon Dioxide | Aunt Jemima ® no gas |
|---|---|---|
| Can date | Single can spray out 3 | Pour out 3 ounce per test |
| Feb. 24, 2007 | ounce per test | |
| Est. shelf life | Chilled 120 days | Freeze thaw product |
| Day 1 | Viscosity test meters 13800 $CO_2$ gassed at 150 psi $CO_2$ in can 6grams Held at 40° F. | Viscosity test meter 16800 Stored at 40° F. Batter has nice consistency easy to pour. |
| Day 15 | Viscosity is at its highest point or thickest point before the $CO_2$ can saturate the batter. Viscosity test meters 13000 $CO_2$ has totally saturated the batter thus stabilizing the batter. Consistency is light and fluffy | Viscosity test meter 8400 Bacteria growth and moisture separation. Consistency is thin. |
| Day 30 | Viscosity test meter 13200 Less batter in the can creates more head space for $CO_2$ Consistency is light and fluffy. | Viscosity test meter 7600 Bacteria growth, off odor and moisture separation Batter unusable. |
| Day 45 | Viscosity test meter 13200 Consistency light fluffy | Test meter could not measure because solids and liquid had separated. |
| Day 60 | Viscosity test meter 13100 Consistency light fluffy | N/A |
| Day 120 | Viscosity test meter 13000 Consistency light fluffy End of the can has extra amount of $CO_2$ pressure released | |
| Fill | 20 oz. | 16 oz. |
| $CO_2$ weight | 6 g average | 0 |
| Can pressure | ~150 (start) ~130 (overnight, no shaking) | ~0 |

Example 18

Browning of Product

Product was prepared as shown in Table 15.1 (20 oz cans 567.0 g product and 5.5 g $CO_2$) or alternatively was a commercially available (Aunt Jemima®) batter prepared according to the directions. Both products were stored at approximately 4° C. (40° F.).

Figure 5:
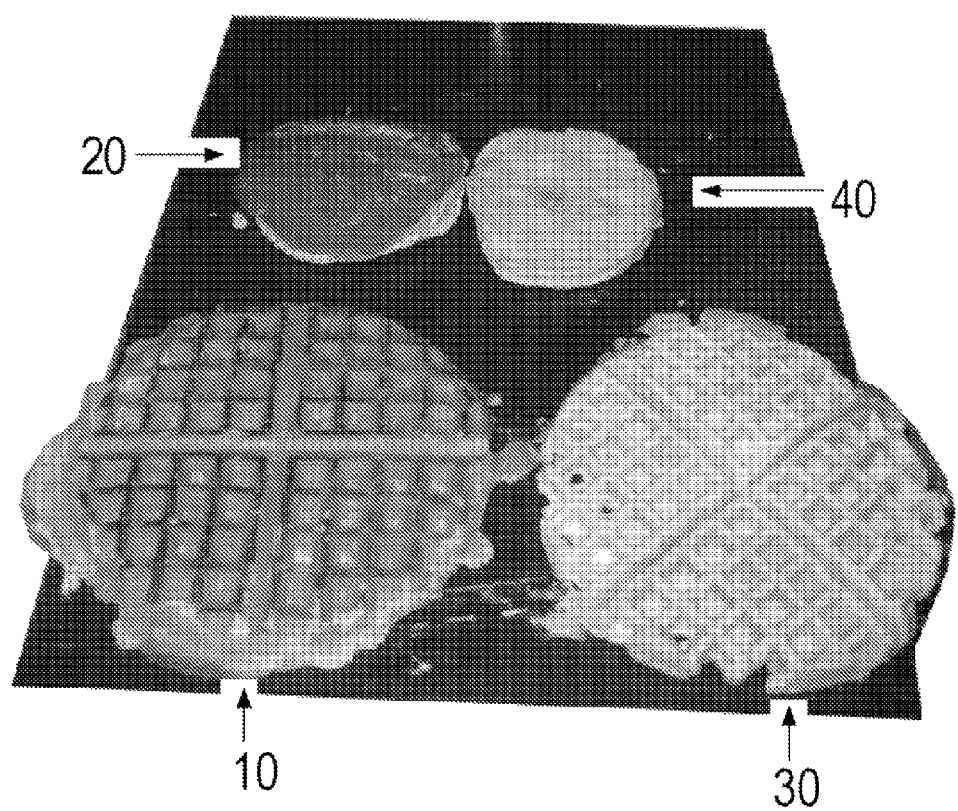
FIG. 5 shows a comparison between waffles (10 and 30) and pancakes (20 and 40), where the waffles and pancakes are baked using batter mixed and dispensed with carbon dioxide from a pressurized canister (10 and 20) or the batter is not mixed or dispensed with carbon dioxide but applied directly to the waffle iron or frying pan (30 and 40).
Figure 6:
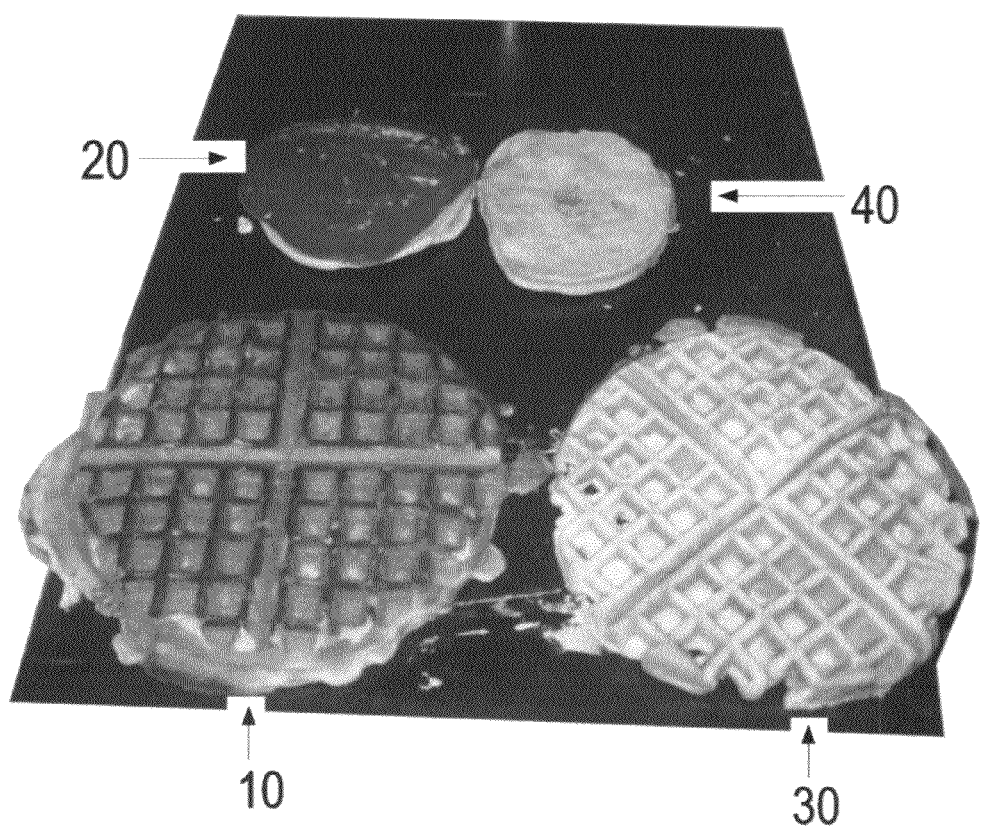
FIG. 6 is a color photograph which shows a comparison between waffles (10 and 30) and pancakes (20 and 40), where the waffles and pancakes are baked using batter mixed and dispensed with carbon dioxide from a pressurized canister (10 and 20) or the batter is not mixed or dispensed with carbon dioxide but applied directly to the waffle iron or frying pan (30 and 40).

FIG. 5 (black and white) and FIG. 6 (color) show a waffle (10) and a pancake (20) which were dispensed from a pressurized canister containing carbon dioxide. In comparison, the same batter applied directly to the waffle iron (30) or frying pan (40) was baked for the same length of time at the same temperature. The carbon dioxide gas allows for the easy flow of the batter from the pressurized canister and also aerates the batter mix. Unexpectedly, the carbon dioxide results in a brownish appearance, crunchy texture and attractive taste to the food product. The carbon dioxide's attractive browning of the waffle or pancake thereby allows the food product to be baked more rapidly and efficiently. The carbon dioxide improves the taste experience of the person consuming the food product.

It is to be understood that other embodiments of the invention can be developed and fall within the spirit and scope of the invention and claims.

In an embodiment of the invention, a bakable food product comprises mixing a plurality of dry ingredients including flour and one or more preservatives with water, wherein the dry ingredients are not homogenized prior to mixing, wherein the ingredients are blended into a batter using a cold process. Sealing the batter in a pressurized dispenser with one or more gasses including carbon dioxide; wherein the gasses assist dispensing the batter from the pressurized dispenser. Wherein bacteria does not grow in the pressurized batter for approximately 180 days when stored between a lower limit of approximately 2° C. (36° F.) and an upper limit of approximately 7° C. (44° F.).

The bakable food product comprising mixing a plurality of dry ingredients including flour and one or more preservatives with water, wherein the dry ingredients are not homogenized prior to mixing, wherein the ingredients are blended into a batter using a cold process. Sealing the batter in a pressurized dispenser with one or more gasses including carbon dioxide; wherein the gasses assist dispensing the batter from the pressurized dispenser. Wherein bacteria does not grow in the pressurized batter for approximately 180 days when stored between a lower limit of approximately 2° C. (36° F.) and an upper limit of approximately 7° C. (44° F.). Wherein the bakable food product is organic.

DEFINITION OF TERMS

Clayton: Clayton Corporation; supplier of valves and caps.

Delivery Weight: the total amount of product sprayed after all the pressure in the can is exhausted.

Bakable: including frying, steaming, toasting, boiling, grilling and cooking including cooking on a waffle iron, cooking on a frying pan and cooking in an oven.

Browning: refers to the color of the bakable food product upon baking and corresponds with the oxidation of one or more of the carbonaceous components in the composition.

Light and Fluffy: easily cut with a plastic knife. Pancake or food product retains shape and form after being compressed. Does not require metal knife or excessive force to cut or slice food product. Food product is not heavy or dense and plastic knife does not permanently compress food product at a distance of 2 mm from the knife blade when cutting food product. Food product does not result in heavy feeling in stomach or other discomfort when eaten. See also sponge-like.

Propellant(s): compressed gas Carbon Dioxide ($CO_2$) or Nitrogen ($N_2$) or a combination of both.

Resident Microorganism: chief microbial flora or the microorganism normally existing in the product.

Retention or Retention Weight: the amount of product remaining in the can after all the pressure in the can is exhausted.

Sponge-like: having the characteristics of a sponge; bread with consistent size of air pockets as in sponge cake; a desirable characteristic of a pancake.

Spray Rate: amount of product sprayed out of a can at a given amount of time; typically in grams per 1 second spray, Summit: Summit Packaging Systems, Inc.; supplier of valves and actuators.

Water: de-ionized water.

What is claimed is:

1. A method of preparing a batter for a bakable food product comprising;
   (a) selecting a plurality of dry ingredients wherein the dry ingredients include flour, sugar, and egg powder and blending said plurality of dry ingredients at a temperature at or below 4° C.;
   (b) adding water at a temperature between approximately 1° C. and 3° C. to the dry ingredients to form a batter wherein the water is no less than 40.5% by weight and no greater than 52.5% by weight of the batter;
   (c) loading the batter into a dispenser at a temperature at or below 4° C.;
   (d) sealing the batter into the dispenser;
   (e) using carbon dioxide gas to pressurize the dispenser such that the batter has a viscosity between approximately 12000 cP and approximately 14000 cP.

2. The method of claim 1, wherein the batter has a pH of approximately 6.

3. The method of claim 1, wherein the batter has a water activity of approximately 0.96.

* * * * *